United States Patent
Maeda et al.

(10) Patent No.: US 12,060,696 B2
(45) Date of Patent: Aug. 13, 2024

(54) WORK SITE MANAGEMENT SYSTEM AND WORK SITE MANAGEMENT METHOD

(71) Applicants: Komatsu Ltd., Tokyo (JP); NATIONAL UNIVERSITY CORPORATION YOKOHAMA NATIONAL UNIVERSITY, Yokohama (JP)

(72) Inventors: Yusuke Maeda, Kanagawa (JP); Yudai Ogawa, Kanagawa (JP); Kenta Osagawa, Tokyo (JP); Atsushi Sakai, Tokyo (JP); Yasuchika Matsui, Tokyo (JP)

(73) Assignees: Komatsu Ltd., Tokyo (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 93 days.

(21) Appl. No.: 17/792,266

(22) PCT Filed: Jan. 14, 2021

(86) PCT No.: PCT/JP2021/001107
§ 371 (c)(1),
(2) Date: Jul. 12, 2022

(87) PCT Pub. No.: WO2021/145392
PCT Pub. Date: Jul. 22, 2021

(65) Prior Publication Data
US 2023/0052077 A1 Feb. 16, 2023

(30) Foreign Application Priority Data
Jan. 16, 2020 (JP) .................................. 2020-005508

(51) Int. Cl.
*E02F 9/20* (2006.01)
*G05D 1/00* (2006.01)
*G05D 1/02* (2020.01)

(52) U.S. Cl.
CPC .......... *E02F 9/2054* (2013.01); *E02F 9/2045* (2013.01); *E02F 9/205* (2013.01); *G05D 1/0217* (2013.01); *G05D 1/0291* (2013.01)

(58) Field of Classification Search
CPC ....... E02F 9/2045; E02F 9/205; E02F 9/2054; G05D 1/0217; G05D 1/0289;
(Continued)

(56) References Cited

U.S. PATENT DOCUMENTS 10,101,740 B2  10/2018  Tanaka et al.
10,310,513 B2 *  6/2019  Maejima ................ B65G 35/08
(Continued)

FOREIGN PATENT DOCUMENTS

JP   2011-14054 A   1/2011
JP   2017-117328 A  6/2017
(Continued)

OTHER PUBLICATIONS

Office Action dated Apr. 14, 2023, issued for the corresponding AU patent application No. 2021208834.

*Primary Examiner* — Tyler J Lee
(74) *Attorney, Agent, or Firm* — Locke Lord LLP

(57) ABSTRACT

A management system includes a course data generation unit that generates course data for each of a plurality of unmanned vehicles such that loading work for the plurality of unmanned vehicles by a loader is sequentially performed on a work site where a plurality of the loaders operates; and a priority determination unit that determine a passage order at an intersection on the work site of the plurality of unmanned vehicles traveling according to the course data so
(Continued)

as to reduce a total loading loss indicating a total of loss amounts in operation of each of the plurality of the loaders.

10 Claims, 14 Drawing Sheets

(58) Field of Classification Search
CPC .............. G05D 1/0291; G05D 1/0297; G05D 2201/021; G06Q 10/06; G06Q 50/08; G08G 1/00
See application file for complete search history.

(56) References Cited

U.S. PATENT DOCUMENTS

| | | | |
|---|---|---|---|
| 10,446,427 B2* | 10/2019 | Honda | .............. H01L 21/67724 |
| 2010/0256836 A1 | 10/2010 | Mudalige | |
| 2017/0283182 A1 | 10/2017 | Maejima et al. | |

FOREIGN PATENT DOCUMENTS

| | | |
|---|---|---|
| JP | 2017-182234 A | 10/2017 |
| JP | 2019-46013 A | 3/2019 |

* cited by examiner

<DURING LOADING WORK> 2-1 ESTIMATED ENDING TIME $T_{end}$: 14:02

2-2
TARGET ARRIVAL TIME $T_{arget}$: 14:02
ESTIMATED ARRIVAL TIME $T_{estimate}$: 14:03
ESTIMATED ENDING TIME $T_{end}$: 14:06
TRAVEL MARGIN $d$: -1 MINUTE 2-3
TARGET ARRIVAL TIME $T_{arget}$: 14:06
ESTIMATED ARRIVAL TIME $T_{estimate}$: 14:04
ESTIMATED ENDING TIME $T_{end}$: 14:09
TRAVEL MARGIN $d$: +2 MINUTES

WORK SITE MANAGEMENT SYSTEM AND WORK SITE MANAGEMENT METHOD

FIELD

The present disclosure relates to a work site management system and a work site management method.

BACKGROUND

In a wide work site, such as a mine, an unmanned vehicle may operate in some cases. Patent Literature 1 discloses an unmanned transport vehicle managed by a mining machine operation management system.

CITATION LIST

Patent Literature

Patent Literature 1: JP 2017-117328 A

SUMMARY

Technical Problem

The unmanned vehicle travels to reciprocate between a loading place where loading work is performed by a loader and a dumping place where dumping work is performed. In some cases, an intersection may be on a transport path between the loading place and the dumping place. When a plurality of unmanned vehicles simultaneously enters the intersection, traveling of at least one of the unmanned vehicles needs to be restricted to avoid interference between the plurality of unmanned vehicles. The unmanned vehicle whose traveling is restricted may take longer time to arrive at the loading place. The longer time taken for the arrival of the unmanned vehicle at the loading place may increase an idle time of the loader, decreasing the productivity on the work site.

An object of the present disclosure is to suppress a decrease in productivity on the work site.

Solution to Problem

According to an aspect of the present invention, a work site management system comprises: a course data generation unit that generates course data for each of a plurality of unmanned vehicles such that loading work for a plurality of the unmanned vehicles by a loader is sequentially performed on a work site where a plurality of the loaders operates; and a priority determination unit that determines a passage order at an intersection on the work site of a plurality of the unmanned vehicles traveling according to the course data so as to reduce a total loading loss indicating a total of loss amounts in operation of each of a plurality of the loaders.

Advantageous Effects of Invention

According to the present disclosure, the decrease in productivity on the work site is suppressed.

DESCRIPTION OF EMBODIMENTS

Embodiments according to the present disclosure will be described below with reference to the drawings, but the present disclosure is not limited to the description. The component elements of the embodiments described below can be appropriately combined with each other. Furthermore, some of the component elements may not be used.

First Embodiment

<Management System>

Figure 1:
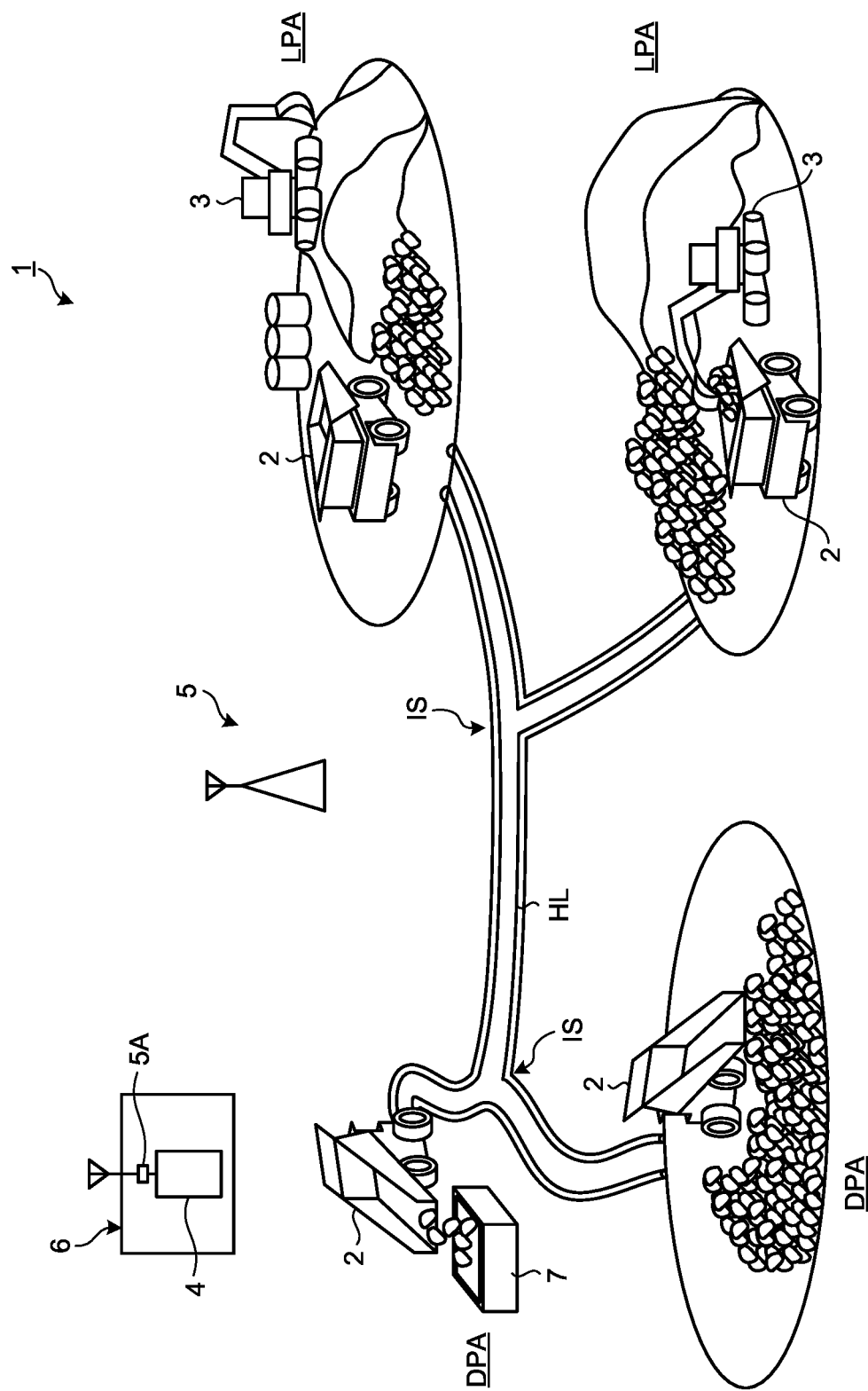
FIG. 1 is a diagram illustrating a work site management system according to an embodiment.

FIG. 1 is a diagram illustrating a work site management system 1 according to an embodiment. In the embodiment, the work site represents a mine. The mine refers to a place or a business facility for mining.

As illustrated in FIG. 1, a plurality of unmanned vehicles 2 and a plurality of loaders 3 operate on the work site. Each of the unmanned vehicles 2 is a vehicle that autonomously operates without depending on a driving operation by a driver. In the embodiment, the unmanned vehicle 2 is an unmanned dump truck that is a kind of transport vehicle transporting a load while traveling on the work site. Examples of the load carried by the unmanned vehicle 2 include ores or earth and sand excavated from the mine. Each of the loaders 3 performs loading work of loading the unmanned vehicles 2. The loader 3 includes working equipment for loading work. As the loader 3, an excavator or a rope excavator is exemplified.

The work site includes a loading place LPA, a dumping place DPA, and a transport path HL. The loading place LPA refers to a workplace where the loading work of loading the unmanned vehicle 2 by the loader 3 is performed. The dumping place DPA refers to a workplace where the dumping work of dumping the load by the unmanned vehicle 2 is performed. The dumping place DPA is provided with, for example, a crusher 7. The transport path HL is provided so as to connect the loading place LPA and the dumping place DPA. A plurality of the loading places LPA is provided. A plurality of the dumping places DPA is provided. The transport path HL leads to the plurality of the loading places LPA and the plurality of the dumping places DPA.

The unmanned vehicle 2 travels on the transport path HL and moves to at least one of the loading place LPA and the dumping place DPA. The unmanned vehicle 2 travels, for example, to reciprocate between the loading place LPA and the dumping place DPA. Note that the unmanned vehicle 2 may travel from a first loading place LPA to a first dumping place DPA and then travel to a second loading place LPA different from the first loading place LPA. The unmanned vehicle 2 may travel from the first dumping place DPA to the second loading place LPA and then to a second dumping place DPA different from the first dumping place DPA. An intersection IS is on the transport path HL between the loading place LPA and the dumping place DPA.

Note that the work site is not limited to the mine. The work site may be, for example, a quarry. The work site may be preferably a work site where the unmanned vehicle 2 transports the load.

The management system 1 includes a management device 4 and a communication system 5. The management device 4 includes a computer system. The management device 4 performs operation management of the plurality of the unmanned vehicles 2. The management device 4 is installed, for example, in a control facility 6 on the work site.

The communication system 5 performs data communication between the management device 4, the unmanned vehicles 2, and the loaders 3. A wireless communication device 5A is connected to the management device 4. The communication system 5 includes the wireless communication device 5A. The management device 4, the unmanned vehicles 2, and the loaders 3 wirelessly communicate with each other via the communication system 5.

<Unmanned Vehicle>

Figure 2:
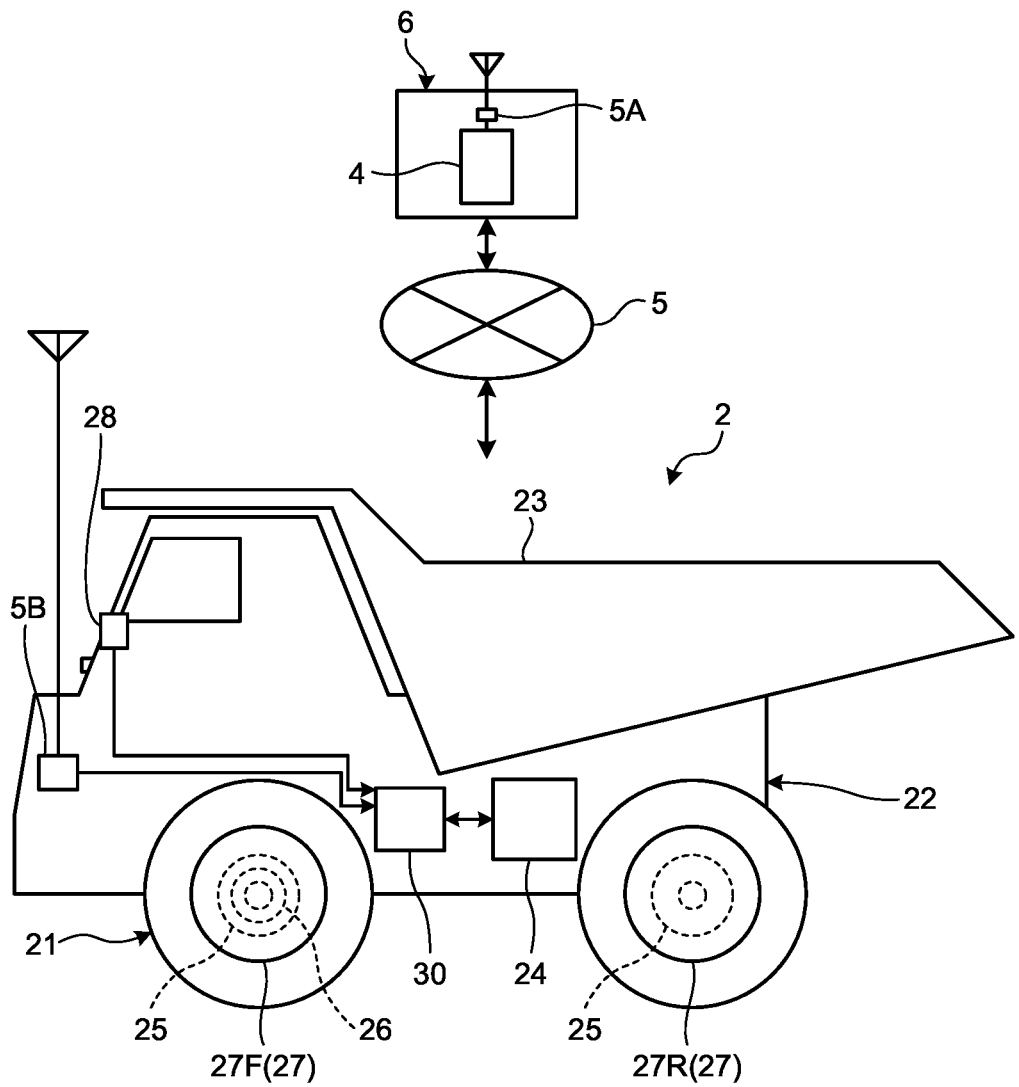
FIG. 2 is a diagram illustrating an unmanned vehicle according to an embodiment.

FIG. 2 is a diagram illustrating the unmanned vehicle 2 according to the embodiment. The unmanned vehicle 2 travels on the work site on the basis of course data CD that is transmitted from the management device 4.

The unmanned vehicle 2 includes a travel unit 21, a vehicle body 22 that is supported by the travel unit 21, a dump body 23 that is supported by the vehicle body 22, a position detection device 28, a wireless communication device 5B, and a control device 30.

The travel unit 21 includes a driving device 24 that drives the travel unit 21, brake devices 25 that brake the travel unit 21, a steering device 26 that steers the travel unit 21, and wheels 27.

Rotation of the wheels 27 causes the unmanned vehicle 2 to travel. The wheels 27 include front wheels 27F and rear wheels 27R. Tires are mounted to the wheels 27.

The driving device 24 generates a driving force for accelerating the unmanned vehicle 2. The driving device 24 includes an internal combustion engine such as a diesel engine or a motor. The driving force generated by the driving device 24 is transmitted to the rear wheels 27R. Each of the brake devices 25 generates a braking force for decelerating or stopping the unmanned vehicle 2. The steering device 26 generates a steering force for adjusting a travel direction of the unmanned vehicle 2. The steering force generated by the steering device 26 is transmitted to the front wheels 27F.

The position detection device 28 detects the position of the unmanned vehicle 2. The position detection device 28 uses a global navigation satellite system (GNSS) to detect the position of the unmanned vehicle 2. The global navigation satellite system includes a global positioning system (GPS). The position detection device 28 includes a GNSS receiver (GPS receiver). The global navigation satellite system detects the position of the unmanned vehicle 2 defined in a global coordinate system. The global coordinate system refers to a coordinate system that is fixed to the earth. The position detection device 28 detects the absolute position (absolute coordinates) of the unmanned vehicle 2 defined by coordinate data of latitude, longitude, and altitude.

The wireless communication device 5B is connected to the control device 30. The communication system 5 includes the wireless communication device 5B. The control device 30 wirelessly communicates with the management device 4 positioned outside the unmanned vehicle 2 via the communication system 5.

The control device 30 includes a computer system. The control device 30 outputs a control command that controls the travel of the unmanned vehicle 2, on the basis of the course data CD transmitted from the management device 4. The control command output from the control device 30 includes an accelerator command for operating the driving device 24, a brake command for operating the brake device 25, and a steering command for operating the steering device 26. The driving device 24 generates a driving force for accelerating the unmanned vehicle 2, on the basis of the accelerator command output from the control device 30. Adjusting an output from the driving device 24 adjusts the traveling speed of the unmanned vehicle 2. The brake device 25 generates the braking force for decelerating or stopping the unmanned vehicle 2, on the basis of the brake command output from the control device 30. The steering device 26 generates the steering force for adjusting the travel direction of the unmanned vehicle 2, on the basis of the steering command output from the control device 30.

<Course Data>

Figure 3:
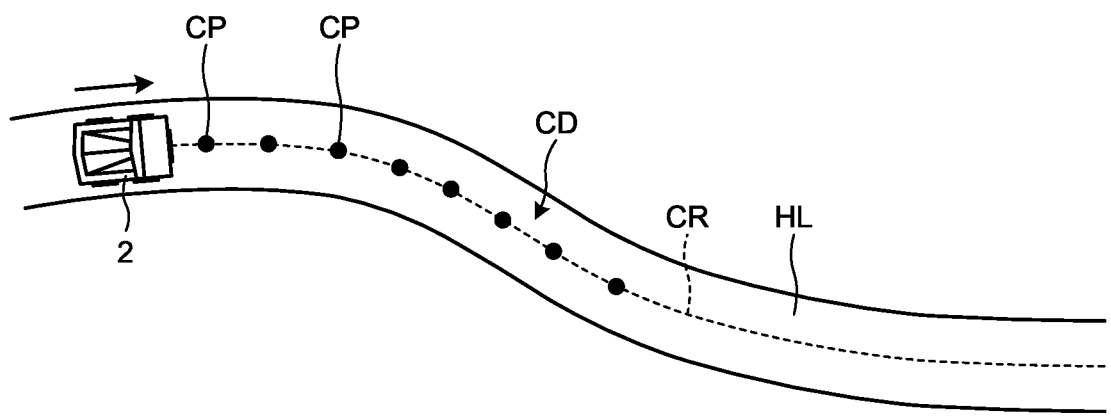
FIG. 3 is a diagram illustrating course data according to an embodiment.

FIG. 3 is a diagram illustrating the course data CD according to the embodiment. The course data CD indicates traveling conditions of the unmanned vehicle 2. The traveling conditions of the unmanned vehicle 2 include a traveling speed, acceleration, deceleration, a stop position, a traveling direction, and a traveling route. The course data CD is set for each of the loading places LPA, the dumping places DPA, and the transport path HL. The unmanned vehicle 2 travels on the work site on the basis of the course data CD.

As illustrated in FIG. 3, the course data CD includes a plurality of course points CP that is set at intervals and a travel course CR that is defined by a line connecting the plurality of course points CP. Each of the course points CP defines a target position of the unmanned vehicle 2 in the global coordinate system. The target position of the unmanned vehicle 2 is defined by latitude, longitude, and altitude. A target traveling speed and a target traveling direction of the unmanned vehicle 2 are set to each of the plurality of course points CP. The travel course CR defines a target traveling route of the unmanned vehicle 2.

The course data CD is generated by the management device 4. The course data CD generated by the management device 4 is transmitted to the control device 30 of the unmanned vehicle 2 via the communication system 5. The control device 30 controls the travel unit 21 on the basis of the course data CD so that the unmanned vehicle 2 travels along the travel course CR and travels according to the target traveling speed and the target traveling direction that are set for each of the plurality of course points CP.

<Travel Permission Area>

Figure 4:
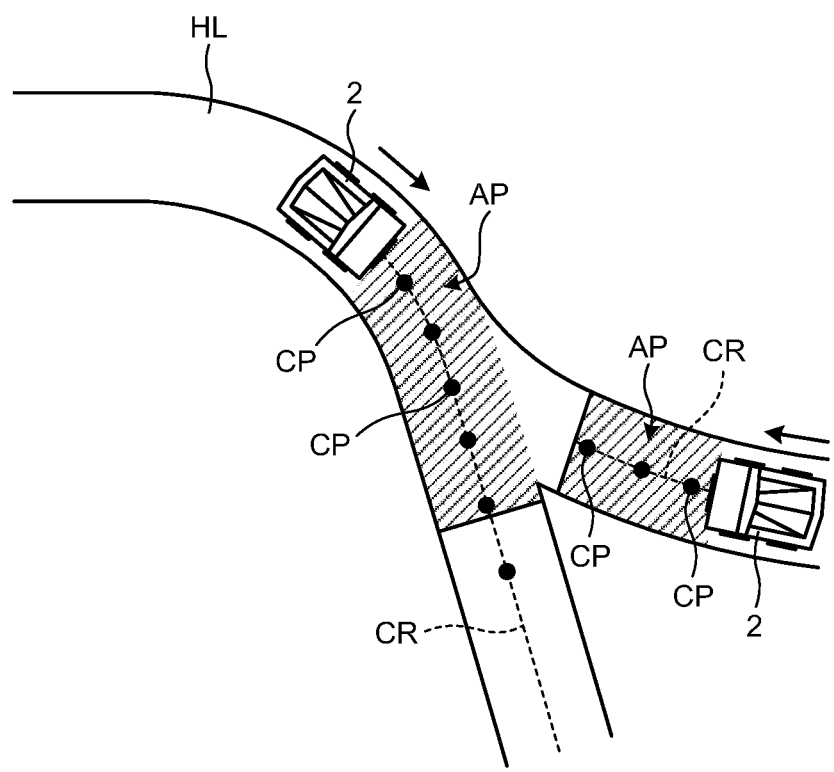
FIG. 4 is a diagram illustrating a travel permission area according to an embodiment.

FIG. 4 is a diagram illustrating a travel permission area AP according to the embodiment. The travel permission area AP is set in front of each unmanned vehicle 2 in the travel direction. The travel permission area AP is set by the management device 4. The travel permission area AP is an area in which the unmanned vehicle 2 is permitted to travel. The unmanned vehicle 2 travels in the travel permission area AP with the travel permission area AP set.

The travel permission area AP is set along the travel course CR. The travel permission area AP has a length that is set so that the plurality of course points CP is positioned in the travel permission area AP. The travel permission area AP has a width that is set to be the same as or larger than a vehicle width of the unmanned vehicle 2.

As the unmanned vehicle 2 moves, the travel permission area AP is updated. When the unmanned vehicle 2 moves forward, the travel permission area AP is updated to move forward in synchronization with the unmanned vehicle 2. The setting of the travelable area AP on the transport path HL after the unmanned vehicle 2 has passed is canceled.

The travel permission areas AP of the plurality of unmanned vehicles 2 are set not to overlap each other. For example, as illustrated in FIG. 4, when two unmanned vehicles 2 travel on the transport path HL so as to approach each other, the management device 4 sets the travel permission areas AP for the two unmanned vehicles 2 so that the two unmanned vehicles 2 do not interfere with each other. In the example illustrated in FIG. 4, the travelable area AP of one of the unmanned vehicles 2 is set to include five course points CP. The travelable area AP of the other of the unmanned vehicles 2 is set to include three course points CP. The management device 4 sets the two travelable areas AP so that that the travelable area AP of one of the unmanned vehicles 2 does not overlap with the travelable area AP of the other of the unmanned vehicles 2. Therefore, interference between the plurality of unmanned vehicles 2 is suppressed.

<Loading Place>

Figure 5:
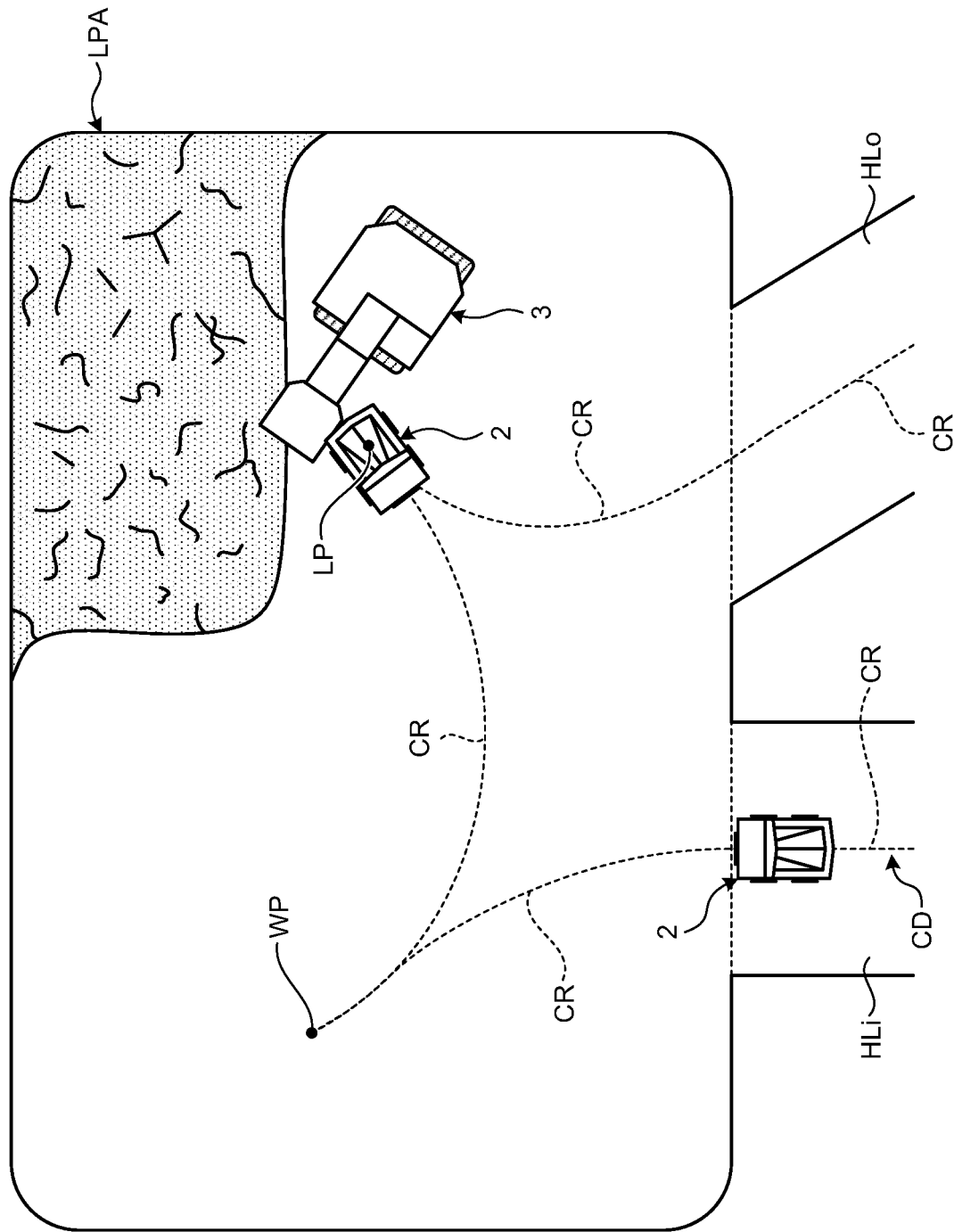
FIG. 5 is a diagram illustrating an operation of the unmanned vehicle in a loading place according to an embodiment.

FIG. 5 is a diagram illustrating an operation of the unmanned vehicle 2 in the loading place LPA according to the embodiment. The loader 3 operates in the loading place LPA. In the example illustrated in FIG. 5, one loader 3 operates in one loading place LPA. Note that a plurality of the loaders 3 may operate in one loading place LPA.

In the example illustrated in FIG. 5, a transport path HLi and a transport path HLo are connected to the loading place LPA. The unmanned vehicle 2 that enters the loading place LPA travels on the transport path HLi. The unmanned vehicle 2 that exits the loading place LPA travels on the transport path HLo. The course data CD is set for each of the transport path HLi, the loading place LPA, and the transport path HLo. The unmanned vehicle 2 travels through the transport path HLi, the loading place LPA, and the transport path HLo according to the course data CD. Note that one transport path HL may be connected to the loading place LPA.

The plurality of unmanned vehicles 2 before performance of the loading work sequentially enters the loading place LPA. In the loading place LPA, the loading work for the plurality of unmanned vehicles 2 by one loader 3 is sequentially performed. The plurality of unmanned vehicles 2 after performance of the loading work sequentially exits the loading place LPA.

A waiting point WP and a loading point LP are set in the loading place LPA. The waiting point WP and the loading point LP are set by the management device 4. The waiting point WP refers to a position where the unmanned vehicle 2 waiting for the loading work is positioned. The loading point LP refers to a position where the unmanned vehicle 2 for which the loading work is performed is positioned. The travel course CR is defined to include the waiting point WP and the loading point LP. Each of the waiting point WP and the loading point LP may be regarded as a kind of the course point CP.

The unmanned vehicle 2 that enters the loading place LPA from the transport path HLi moves to the waiting point WP according to the course data CD. The unmanned vehicle 2 stops at the waiting point WP to wait for the loading work. In the embodiment, the waiting point WP is a switchback point at which the unmanned vehicle 2 switches back. The switchback refers to the motion of the unmanned vehicle 2 to move forward, change the traveling direction, and approach the loading point LP while moving backward. The unmanned vehicle 2 that moves forward and enters the loading place LPA from the transport path HLi switches back at the waiting point WP according to the course data CD, and moves to the loading point LP while moving backward.

The unmanned vehicle 2 that moves to the loading point LP stops at the loading point LP. The loader 3 performs the loading work for the unmanned vehicle 2 stopped at the loading point LP. When a preceding unmanned vehicle 2 is positioned at the loading point LP and the loading work is being performed, the next unmanned vehicle 2 waits at the waiting point WP. The unmanned vehicle 2 after performance of the loading work at the loading point LP moves forward and exits the loading place LPA to the transport path HLo, according to the course data CD.

<Intersection>

Figure 6:
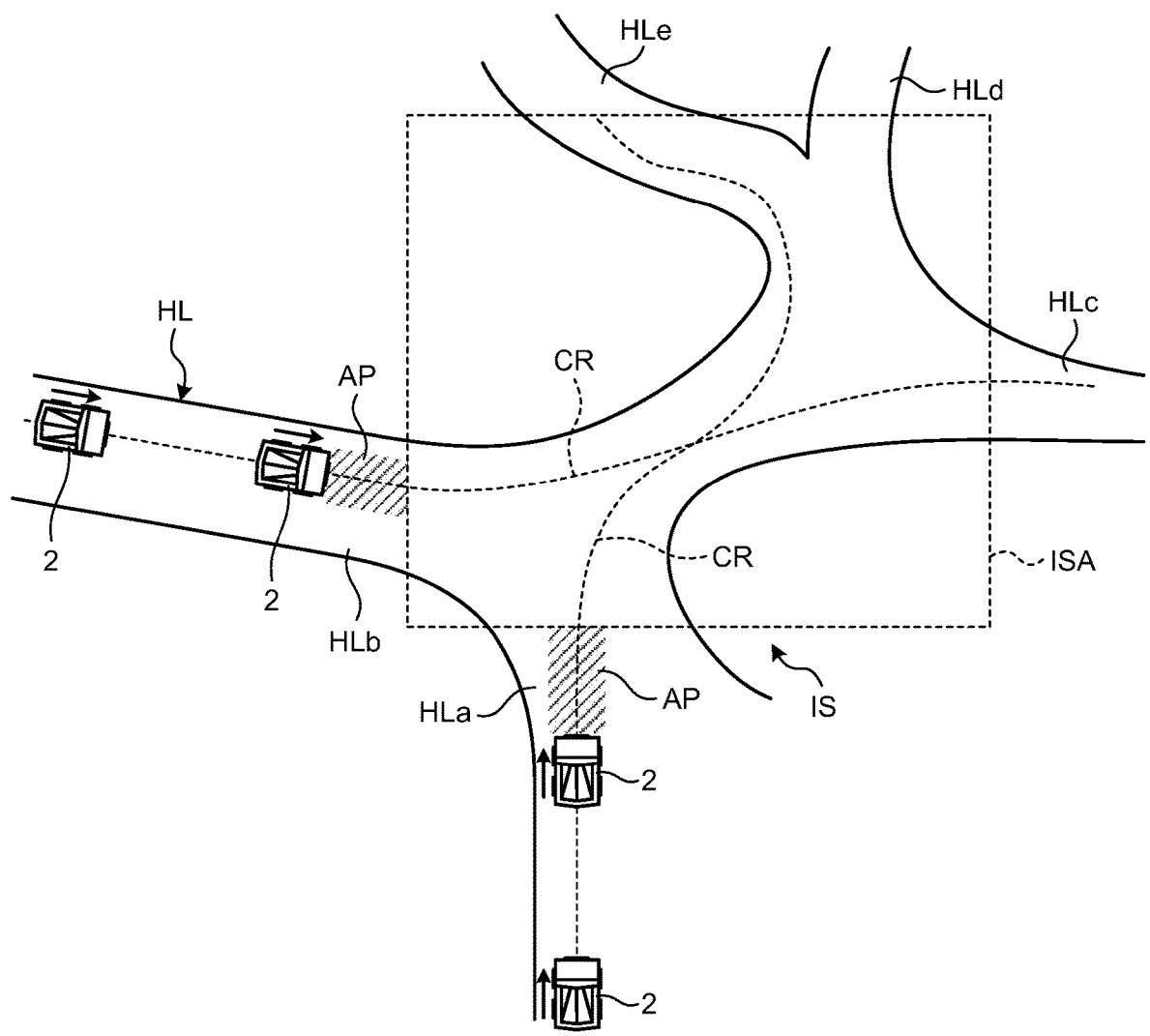
FIG. 6 is a diagram illustrating an example of an intersection according to an embodiment.

FIG. 6 is a diagram illustrating an example of the intersection IS according to the embodiment. As illustrated in FIG. 6, the transport path HL includes the intersection IS. The intersection IS refers to a portion where a plurality of the transport paths HL intersects. As illustrated in FIG. 6, when the work site is the mine, the intersection IS often has a complex shape. In addition, the intersection IS is formed from a large number of transport paths HL, in some cases.

An intersection area ISA is set to the intersection IS. The intersection area ISA is set by the management device 4. The intersection area ISA is set to include the plurality of transport paths HL constituting the intersection IS. In the example illustrated in FIG. 6, the intersection IS is constituted by a transport path HLa, a transport path HLb, a transport path HLc, a transport path HLd, and a transport path HLe. The intersection area ISA is set to include five transport paths HL (HLa, HLb, HLc, HLd, and HLe).

As illustrated in FIG. 6, the plurality of unmanned vehicles 2 attempts to enter the intersection IS simultaneously, in some cases. When the plurality of unmanned vehicles 2 attempts to enter the intersection IS simultaneously, the travel of at least one of the unmanned vehicles 2 needs to be restricted to avoid interference between the plurality of unmanned vehicles 2. The unmanned vehicle 2 whose traveling is restricted may take longer time to arrive at the loading place LPA. The longer time taken for the arrival of the unmanned vehicle 2 at the loading place LPA may increase an idle time of the loader 3, decreasing the productivity on the work site. The idle time of the loader 3 refers to a time during which the loader 3 cannot perform the loading work when sequentially performing the loading work for the plurality of unmanned vehicles 2.

In other words, when the unmanned vehicle 2 is restricted from traveling through the intersection IS in a case where the loading work for the plurality of unmanned vehicles 2 is sequentially performed by one loader 3, there is a high possibility that the unmanned vehicle 2 whose traveling is restricted cannot arrive at the loading place LP by the end time of the loading work for a preceding unmanned vehicle 2. A longer time period from the end time of the loading work for the preceding unmanned vehicle 2 to the arrival time of the next unmanned vehicle 2 at the loading place LPA makes the idle time of the loader 3 longer.

In the embodiment, in a case where the plurality of unmanned vehicles 2 attempts to enter the intersection IS simultaneously, the management device 4 determines a passage order of the plurality of unmanned vehicles 2 at the intersection IS so as to reduce a loss amount in operation of the loader 3. The loss amount in operation of the loader 3 includes the idle time of the loader 3. The management device 4 determines the passage order of the plurality of unmanned vehicles 2 at the intersection IS so as to reduce the idle time of the loader 3.

On the work site, the plurality of loaders 3 operates. On the work site, the plurality of loading places LPA is provided. The plurality of loaders 3 operates in the plurality of loading places LPA. The management device 4 determines the passage order of the plurality of unmanned vehicles 2, which travels according to the course data CD, at the intersection IS so as to reduce a total loading loss that indicates a total of the loss amounts in operation of each of the plurality of loaders 3. The management device 4 controls the travel of the plurality of unmanned vehicles 2 so that the plurality of unmanned vehicles 2 passes through the intersection IS on the basis of the determined passage order.

In the embodiment, entering of the unmanned vehicle 2 into the intersection IS means entering of a front portion of the travel permission area AP set for the unmanned vehicle 2 into the intersection area ISA. The management device 4 determines whether the plurality of unmanned vehicles 2 enters the intersection area ISA, on the basis of a relative position between the travel permission area AP and the intersection area ISA. When determining that the plurality of unmanned vehicles 2 simultaneously enters the intersection area ISA, the management device 4 starts arithmetic processing for determining the passage order of the plurality of unmanned vehicles 2 at the intersection IS.

<Management Device and Control Device>

Figure 7:
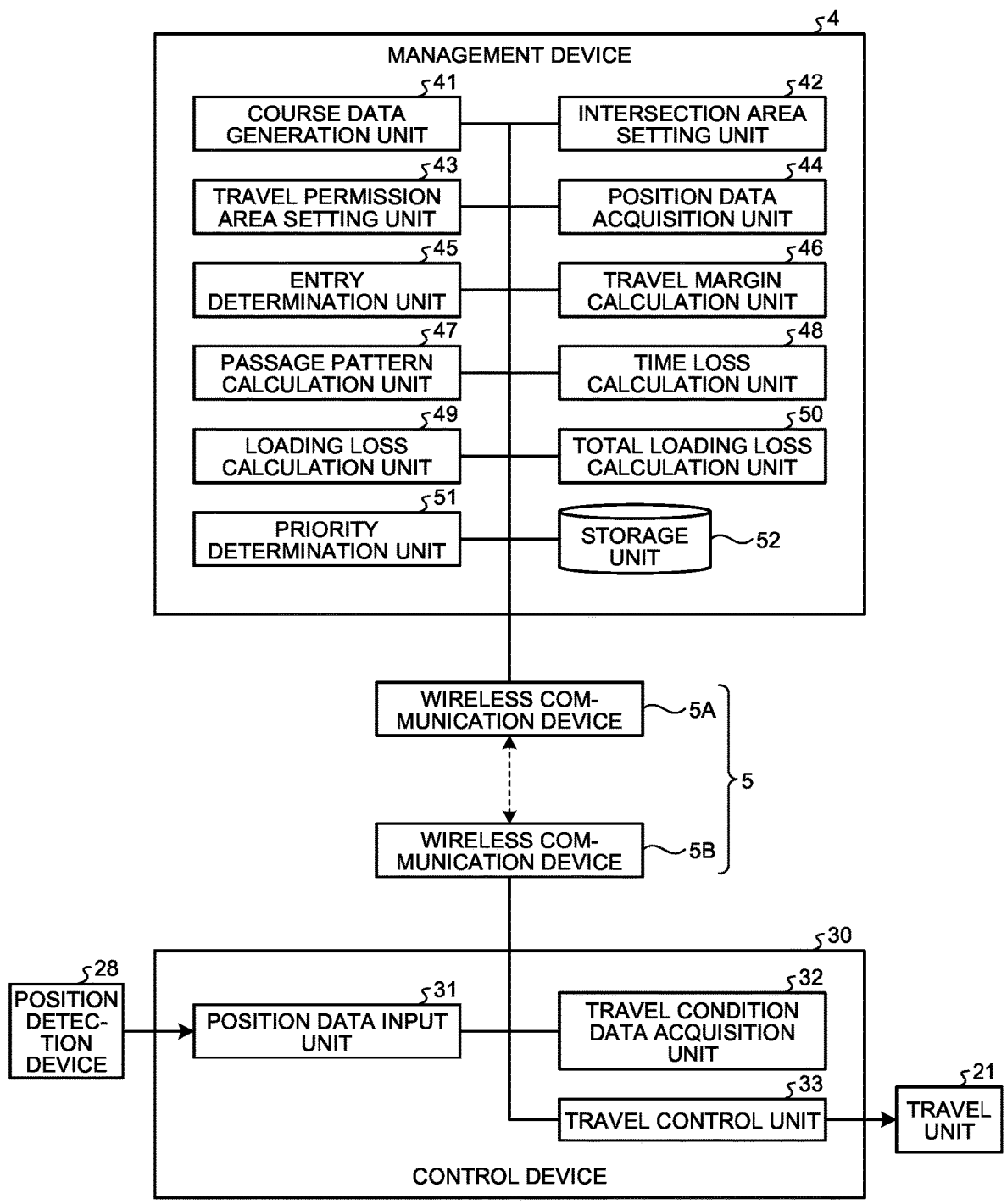
FIG. 7 is a functional block diagram illustrating the management system according to an embodiment.

FIG. 7 is a functional block diagram illustrating the management system 1 according to an embodiment. As illustrated in FIG. 7, the management device 4 includes a course data generation unit 41, an intersection area setting unit 42, a travel permission area setting unit 43, a position data acquisition unit 44, an entry determination unit 45, a travel margin calculation unit 46, a passage pattern calculation unit 47, a time loss calculation unit 48, a loading loss calculation unit 49, a total loading loss calculation unit 50, a priority determination unit 51, and a storage unit 52.

The course data generation unit 41 generates the course data CD for each of the plurality of unmanned vehicles 2. The course data generation unit 41 generates the course data CD so that the loading work for the plurality of unmanned vehicles 2 by the loader 3 is sequentially performed.

Figure 8:
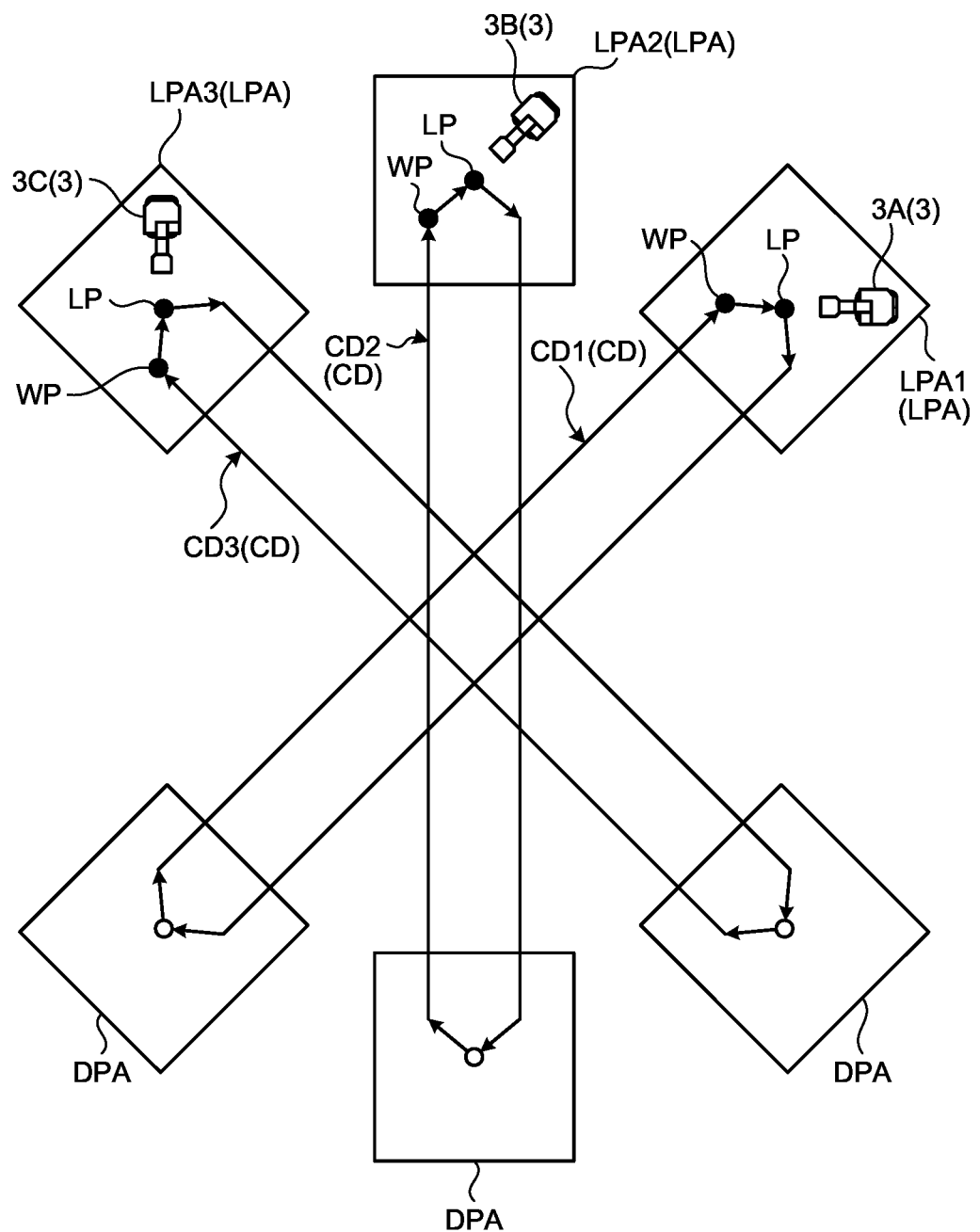
FIG. 8 is a diagram illustrating processing by a course data generation unit according to an embodiment.

FIG. 8 is a diagram illustrating processing by the course data generation unit 41 according to the embodiment. As illustrated in FIG. 8, in the embodiment, three loading places LPA are provided on the work site, and one loader 3 is positioned in each of the three loading places LPA. The three loaders 3 operate in each of the three loading places LPA. A first loader 3A operates in a first loading place LPA1. A second loader 3B operates in a second loading place LPA2. A third loader 3C operates in a third loading place LPA3. Although not illustrated, the plurality of unmanned vehicles 2, for example, approximately 30 unmanned vehicles, operates on the work site.

The course data generation unit 41 generates, as the course data CD, first course data CD1 for the unmanned vehicle 2 for which the loading work by the first loader 3A is performed, second course data CD2 for the unmanned vehicle 2 for which the loading work by the second loader 3B is performed, and third course data CD3 for the unmanned vehicle 2 for which the loading work by the third loader 3C is performed. The plurality of unmanned vehicles 2 belonging to a first group for which the loading work by the first loader 3A is performed travels according to the first course data CD1. The plurality of unmanned vehicles 2 belonging to a second group for which the loading work by the second loader 3B is performed travels according to the second course data CD2. The plurality of unmanned vehicles 2 belonging to a third group for which the loading work by the third loader 3C is performed travels according to the third course data CD3.

The course data generation unit 41 generates the first course data CD1 so that the loading work for the unmanned vehicles 2 in the first group by the first loader 3A is sequentially performed. The unmanned vehicles 2 in the first group travel toward the first loading place LPA1 according to the first course data CD1. After waiting at the waiting point WP in the first loading place LPA1, the unmanned vehicles 2 in the first group sequentially enter the loading point LP in the first loading place LPA1. The first loader 3A sequentially performs the loading work for the plurality of unmanned vehicles 2 sequentially positioned in the loading point LP.

The course data generation unit 41 generates the second course data CD2 so that the loading work for the unmanned vehicles 2 in the second group by the second loader 3B is sequentially performed. The unmanned vehicles 2 in the second group travel toward the second loading place LPA2 according to the second course data CD2. After waiting at the waiting point WP in the second loading place LPA2, the unmanned vehicles 2 in the second group sequentially enter the loading point LP in the second loading place LPA2. The second loader 3B sequentially performs the loading work for the plurality of unmanned vehicles 2 sequentially positioned in the loading point LP.

The course data generation unit 41 generates the third course data CD3 so that the loading work for the unmanned vehicles 2 in the third group by the third loader 3C is sequentially performed. The unmanned vehicles 2 in the third group travel toward the third loading place LPA3 according to the third course data CD3. After waiting at the waiting point WP in the third loading place LPA3, the unmanned vehicles 2 in the third group sequentially enter the loading point LP in the third loading place LPA3. The third loader 3C sequentially performs the loading work for the plurality of unmanned vehicles 2 sequentially positioned in the loading point LP.

The intersection area setting unit 42 sets the intersection area ISA to the intersection IS on the work site. As described with reference to FIG. 6, the intersection area ISA is set to include the plurality of transport paths HL constituting the intersection IS. The intersection area ISA is set in the same coordinate system as the course data CD. When the course data CD is set in the global coordinate system, the intersection area ISA is also set in the global coordinate system.

The travel permission area setting unit 43 sets the travel permission area AP in front of the unmanned vehicle 2 in the travel direction. The travel permission area setting unit 43 sets the travel permission area AP for each of the plurality of unmanned vehicles 2 operating on the work site. As described with reference to FIG. 4, the travel permission area AP is set to include the plurality of course points CP. The travel permission area AP is set in the same coordinate system as the course data CD. When the course data CD is set in the global coordinate system, the travel permission area AP is also set in the global coordinate system.

The position data acquisition unit 44 acquires position data of each of the plurality of unmanned vehicles 2 operating on the work site. The position of each unmanned vehicle 2 is detected by the position detection device 28. The position data of the unmanned vehicle 2 detected by the position detection device 28 is transmitted to the management device 4 via the communication system 5. The position data acquisition unit 44 acquires the position data of the unmanned vehicle 2 detected by the position detection device 28, via the communication system 5.

The entry determination unit 45 determines whether the plurality of unmanned vehicles 2 simultaneously enters the intersection IS, on the basis of the position data of the plurality of unmanned vehicles 2 acquired by the position data acquisition unit 44. In the embodiment, the entry determination unit 45 determines whether the plurality of unmanned vehicles 2 enters the intersection IS, on the basis of each relative position between the travel permission area AP and the intersection IS.

Figure 9:
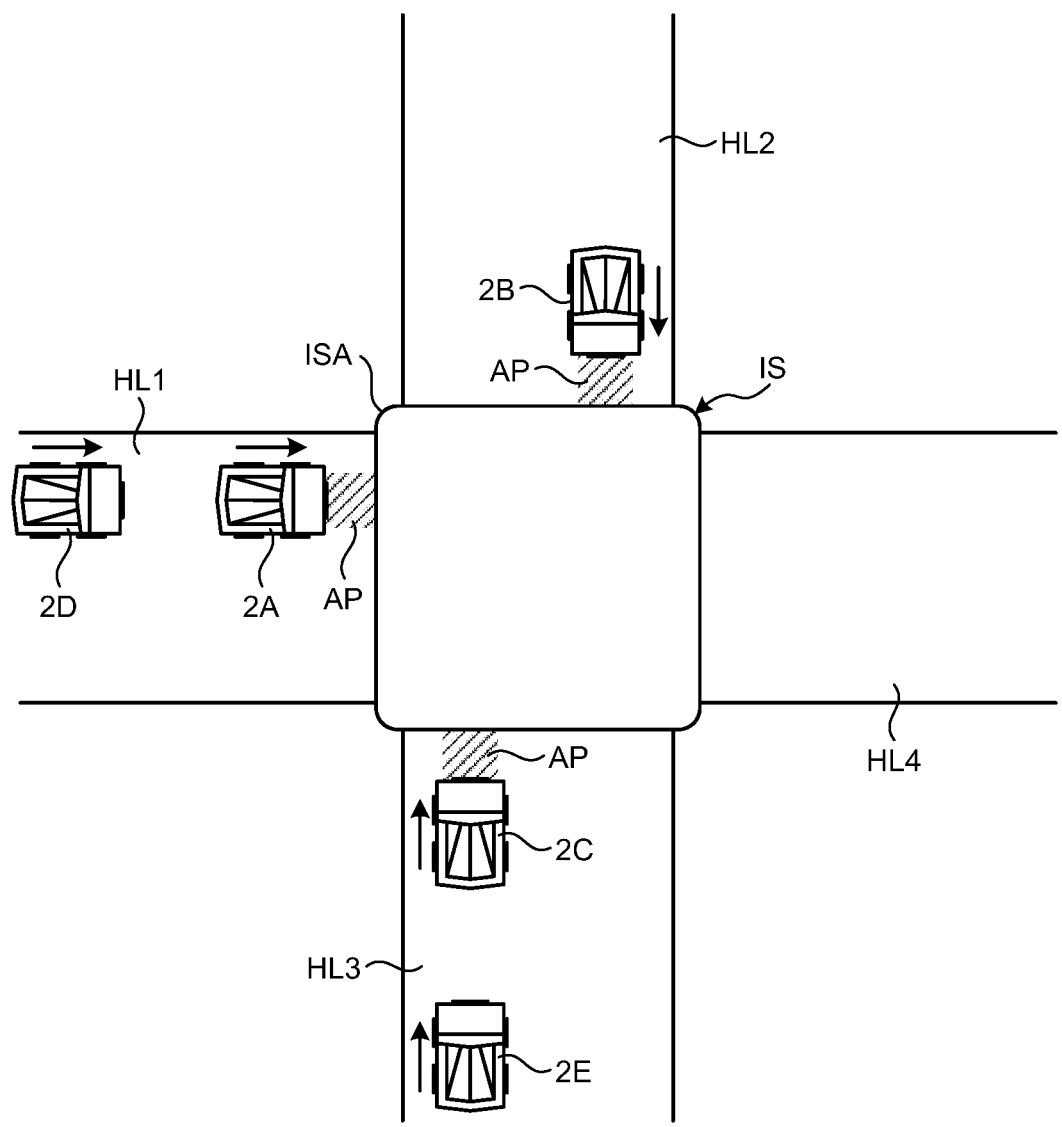
FIG. 9 is a diagram illustrating processing by an entry determination unit according to an embodiment.

FIG. 9 is a diagram illustrating processing by the entry determination unit 45 according to the embodiment. In the embodiment, as illustrated in FIG. 9, it is assumed that an unmanned vehicle 2A, an unmanned vehicle 2B, and an unmanned vehicle 2C simultaneously enter the intersection IS. In addition, it is assumed that the unmanned vehicle 2A, the unmanned vehicle 2B, the unmanned vehicle 2C, an unmanned vehicle 2D, and an unmanned vehicle 2E are scheduled to pass through the intersection IS.

In the example illustrated in FIG. 9, the intersection IS includes a transport path HL1, a transport path HL2, a transport path HL3, and a transport path HL4. The unmanned vehicle 2A and the unmanned vehicle 2D travel on the transport path HL1 toward the intersection IS. The unmanned vehicle 2B travels on the transport path HL2 toward the intersection IS. The unmanned vehicle 2C and the unmanned vehicle 2E travel on the transport path HL3 toward the intersection IS. The unmanned vehicle 2A travels in front of the unmanned vehicle 2D on the transport path HL1 toward the intersection IS. The unmanned vehicle 2C travels in front of the unmanned vehicle 2E on the transport path HL3 toward the intersection IS.

In the embodiment, it is assumed that the unmanned vehicle 2A and the unmanned vehicle 2D travel toward the first loader 3A (first loading place LPA1) according to the first course data CD1. It is assumed that the unmanned vehicle 2B travels toward the second loader 3B (second loading place LPA2) according to the second course data CD2. It is assumed that the unmanned vehicle 2C and the unmanned vehicle 2E travel toward the third loader 3C (third loading place LPA3) according to the third course data CD3.

Note that each of the unmanned vehicle 2A, the unmanned vehicle 2B, the unmanned vehicle 2C, the unmanned vehicle 2D, and the unmanned vehicle 2E may travel toward different loaders 3 (loading places LPA).

In the embodiment, the entry determination unit 45 determines whether the plurality of unmanned vehicles 2 enters the intersection IS simultaneously, on the basis of each relative position between the intersection area ISA and the travel permission area AP that is set for each of the plurality of unmanned vehicles 2 (2A, 2B, and 2C) attempting to enter the intersection IS almost simultaneously.

In other words, on the basis of the intersection area ISA set by the intersection area setting unit 42, each travel permission area AP set by the travel permission area setting unit 43, and the position data of each unmanned vehicle 2 acquired by the position data acquisition unit 44, the entry determination unit 45 determines that the plurality of unmanned vehicles 2 simultaneously enters the intersection IS when the front portions of a plurality of the travel permission areas AP attempt to enter the intersection area ISA almost simultaneously.

In the example illustrated in FIG. 9, the front portion of the travel permission area AP set for the unmanned vehicle 2A, the front portion of the travel permission area AP set for the unmanned vehicle 2B, and the front portion of the travel permission area AP set for the unmanned vehicle 2C enter the intersection area ISA almost simultaneously.

In the example illustrated in FIG. 9, on the basis of the intersection area ISA set by the intersection area setting unit 42, each travel permission area AP set by the travel permission area setting unit 43, and the position data of each unmanned vehicle 2 acquired by the position data acquisition unit 44, the entry determination unit 45 determines that the front portion of the travel permission area AP set for the unmanned vehicle 2A, the front portion of the travel permission area AP set for the unmanned vehicle 2B, and the front portion of the travel permission area AP set for the unmanned vehicle 2C enter the intersection area ISA almost simultaneously, and determines that three unmanned vehicles 2 (2A, 2B, and 2C) enter the intersection IS.

When the entry determination unit 45 determines that the plurality of unmanned vehicles 2 (2A, 2B, and 2C) enters the intersection IS, the travel margin calculation unit 46 calculates a travel margin id that indicates a value obtained by subtracting estimated arrival time $^{i}T_{estimate}$ from target arrival time $^{i}T_{target}$, for each unmanned vehicle i at the loading place LPA where the loading work is performed.

It is assumed that the unmanned vehicle i indicates a plurality of unmanned vehicles 2 scheduled to pass through the intersection IS. The letter i indicates the number of unmanned vehicles 2 scheduled to pass through the intersection IS. In the embodiment, the unmanned vehicles 2 scheduled to pass through the intersection IS are five unmanned vehicles 2 (2A, 2B, 2C, 2D, and 2E). In other words, i=1 to 5.

The travel margin calculation unit 46 calculates the travel margin id for each of a plurality of the unmanned vehicles i scheduled to pass through the intersection IS. The travel margin calculation unit 46 calculates the travel margin id for each of the five unmanned vehicles 2 (2A, 2B, 2C, 2D, and 2E).

The travel margin $^{i}d$ indicates the travel margin of each of the plurality of the unmanned vehicles i scheduled to pass through the intersection IS. The target arrival time $^{i}T_{target}$ indicates the target arrival time of each of the plurality of the unmanned vehicles i. The estimated arrival time $^{i}T_{estimate}$ indicates the estimated arrival time of each of the plurality of unmanned vehicles i.

Note that, as will be described later, when the plurality of unmanned vehicles i simultaneously enters the intersection IS, traveling of at least one of the unmanned vehicles i is restricted on the basis of the passage order at the intersection IS in order to avoid interference between the plurality of unmanned vehicles i, in some cases. The unmanned vehicle i whose traveling is restricted is decelerated or stopped before entering the intersection IS. The estimated arrival time $^iT_{estimate}$ also takes into consideration a delay due to deceleration or stop of the unmanned vehicle i based on the passage order at the intersection IS.

The target arrival time $^iT_{target}$ is the time at which the unmanned vehicle i should arrive at the loading place LPA to minimize (to zero) the idle time of the loader 3 that performs the loading work for the unmanned vehicle i. The estimated arrival time $^iT_{estimate}$ is the estimated time at which the unmanned vehicle $^id$ arrives at the loading place LPA. The travel margin id of the unmanned vehicle i indicates a value obtained by subtracting the estimated arrival time $^iT_{estimate}$ from the target arrival time $^iT_{target}$, for the unmanned vehicle i. In other words, the following formula (1) holds.

$$^id = {^iT_{target}} - {^iT_{estimate}} \quad (1)$$

The travel margin $^id$ is a numerical value indicating the degree of margin of the unmanned vehicle i for the movement from the intersection IS to the loading place LPA.

As described above, the loading work for the plurality of unmanned vehicles 2 by one loader 3 is sequentially performed. After the loading work for a preceding unmanned vehicle 2 is finished, the loading work for a next unmanned vehicle 2 is performed. In reducing the idle time of the loader 3, the larger travel margin $^id$ means that the unmanned vehicle i has a margin of deceleration or stop during the movement to the loading place LPA. The smaller travel margin $^id$ means that the unmanned vehicle i has no margin of deceleration or stop during the movement to the loading place LPA, and needs to travel at full speed. The travel margin $^id$ having a negative value means that the unmanned vehicle i is expected to be delayed to the next loading work.

In the embodiment, the target arrival time $^iT_{target}$ of the unmanned vehicle i is the target arrival time at the waiting point WP. In other words, the target arrival time $^iT_{target}$ is the time at which the unmanned vehicle i scheduled to enter the intersection IS should arrive at the waiting point WP in the loading place LPA to minimize (to zero) the idle time of the loader 3 that performs the loading work for the unmanned vehicle i.

In the embodiment, when the loading work for the plurality of unmanned vehicles i by one loader 3 is sequentially performed, the target arrival time $^iT_{target}$ of a next unmanned vehicle i represents estimated ending time $^iT_{end}$ of the loading work for a preceding unmanned vehicle i.

Figure 10:
FIG. 10 is a diagram illustrating target arrival time, estimated arrival time, and a travel margin according to an embodiment.
Figure 10:
Figure 10:

FIG. 10 is a diagram illustrating the target arrival time $^iT_{target}$, the estimated arrival time $^iT_{estimate}$, and the travel margin $^id$ according to the embodiment. FIG. 10 illustrates a relationship between the target arrival time $^iT_{target}$, the estimated arrival time $^iT_{estimate}$, and the travel margin $^id$ of each of three unmanned vehicles 2 ($2_{-1}$, $2_{-2}$, and $2_{-3}$) for which the loading work is sequentially performed by one loader 3.

The estimated ending time $^iT_{end}$ of the loading work for each unmanned vehicle i is calculated on the basis of the estimated arrival time $^iT_{estimate}$ of the unmanned vehicle i at the waiting point WP and a required loading time for one unmanned vehicle i. The required loading time refers to a time required for one loader 3 to perform the loading work for one unmanned vehicle i. The required loading time is known data that is determined on the basis of, for example, specifications of the loader 3 or past record data about the required loading time. The required loading time is stored in the storage unit 52. The required loading time has a constant value. In the example illustrated in FIG. 10, the required loading time is three minutes.

In the embodiment, the target arrival time $^iT_{target}$ of the unmanned vehicle 2 at the waiting point WP is the estimated ending time $^iT_{end}$ of the loading work for the preceding unmanned vehicle 2. In other words, in order to minimize (to zero) the idle time of the loader 3, the next unmanned vehicle 2 needs to arrive at the waiting point WP by the estimated ending time $^iT_{end}$ of the loading work for the preceding unmanned vehicle 2.

In the example illustrated in FIG. 10, it is assumed that the estimated ending time $^iT_{end}$ of the loading work for the unmanned vehicle $2_{-1}$ of the three unmanned vehicles 2, for which the loading work is being performed, is 14:02.

The target arrival time $^iT_{target}$ of the unmanned vehicle $2_{-2}$, for which the loading work is to be performed subsequent to the unmanned vehicle $2_{-1}$, at the waiting point WP is 14:02 that is the same as the estimated ending time $^iT_{end}$ of the loading work for the preceding unmanned vehicle $2_{-1}$. The estimated arrival time $^iT_{estimate}$ of the unmanned vehicle $2_{-2}$ at the waiting point WP is 14:03. The estimated arrival time $^iT_{estimate}$ of the unmanned vehicle $2_{-2}$ is calculated on the basis of the course data CD for the unmanned vehicle $2_{-2}$. The course data CD includes the target traveling speed and the target traveling route of the unmanned vehicle $2_{-2}$. A distance from the unmanned vehicle $2_{-2}$ to the waiting point WP can be calculated on the basis of the current position data and target traveling route of the unmanned vehicle $2_{-2}$. A time period required for the unmanned vehicle $2_{-2}$ to arrive at the waiting point WP is calculated on the basis of the target traveling speed of the unmanned vehicle $2_{-2}$ defined in the course data CD and the distance to the waiting point WP. Therefore, the travel margin calculation unit 46 can calculate the estimated arrival time $^iT_{estimate}$ of the unmanned vehicle $2_{-2}$ at the waiting point WP on the basis of the current position data of the unmanned vehicle $2_{-2}$ and the course data CD for the unmanned vehicle $2_{-2}$.

Therefore, the travel margin $^id$ of the unmanned vehicle $2_{-2}$ is − one minute (=14:02−14:03). In addition, the required loading time is three minutes, and thus, the estimated ending time $^iT_{end}$ of the loading work for the unmanned vehicle $2_{-2}$ is 14:06.

The target arrival time $^iT_{target}$ of the unmanned vehicle $2_{-3}$, for which the loading work is to be performed subsequent to the unmanned vehicle $2_{-2}$, at the waiting point WP is 14:06 that is the same as the estimated ending time $^iT_{end}$ of the loading work for the preceding unmanned vehicle $2_{-2}$. The estimated arrival time $^iT_{estimate}$ of the unmanned vehicle $2_{-3}$ at the waiting point WP is 14:04.

Therefore, the travel margin $^id$ of the unmanned vehicle $2_{-3}$ is + two minutes (=14:06−14:04). In addition, the required loading time is three minutes, and thus, the estimated ending time $^iT_{end}$ of the loading work for the unmanned vehicle $2_{-3}$ is 14:09.

When the entry determination unit 45 determines that the plurality of unmanned vehicles 2 enters the intersection IS, the passage pattern calculation unit 47 calculates a plurality of patterns of passage order of the plurality of unmanned vehicles 2 at the intersection IS.

Figure 11:
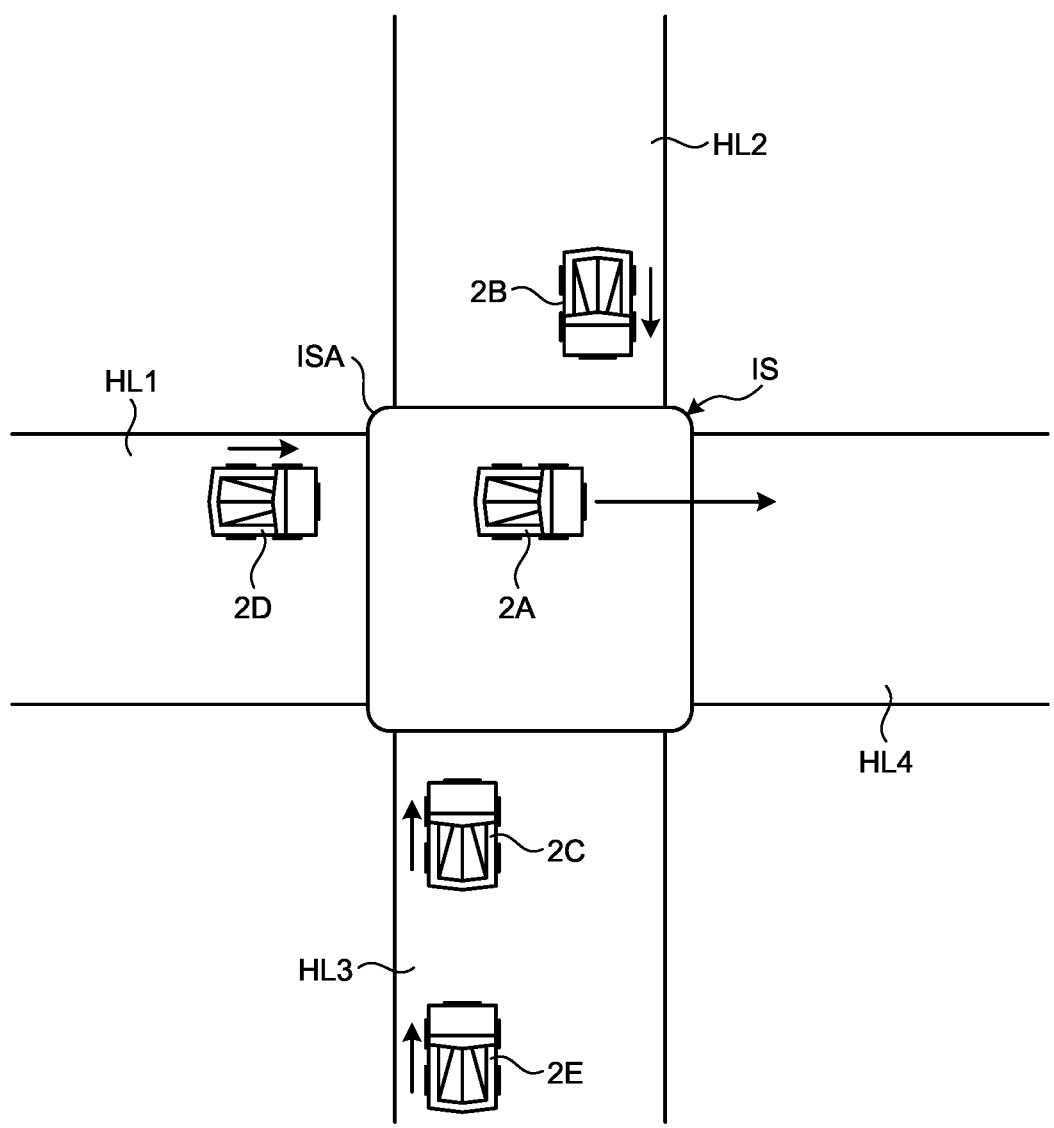
FIG. 11 is a diagram illustrating a pattern of passage order according to an embodiment.
Figure 12:
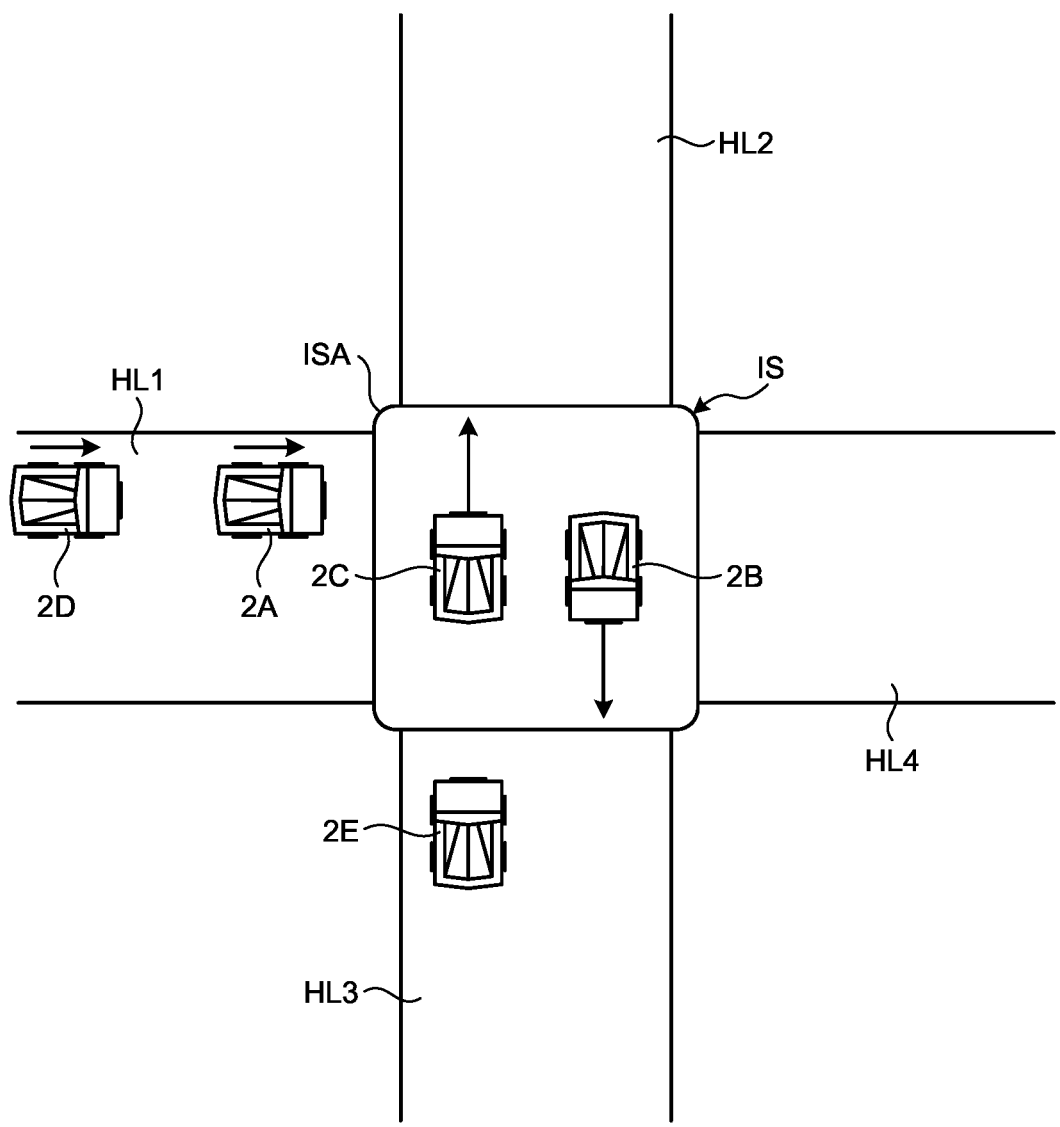
FIG. 12 is a diagram illustrating a pattern of passage order according to an embodiment.

FIGS. 11 and 12 are diagrams illustrating the patterns of passage order according to the embodiment. FIG. 11 illustrates a first pattern in which the unmanned vehicle 2A of the unmanned vehicle 2A, the unmanned vehicle 2B, the unmanned vehicle 2C, the unmanned vehicle 2D, and the unmanned vehicle 2E passes through the intersection IS first. FIG. 12 illustrates a second pattern in which the unmanned vehicle 2B and the unmanned vehicle 2C of the unmanned vehicle 2A, the unmanned vehicle 2B, the unmanned vehicle 2C, the unmanned vehicle 2D, and the unmanned vehicle 2E pass through the intersection IS first.

In the embodiment, it is assumed that the passage pattern calculation unit 47 calculates the first pattern in which the unmanned vehicle 2A passes through the intersection IS first and the second pattern in which the unmanned vehicle 2B and the unmanned vehicle 2C pass through the intersection IS first, as illustrated in FIGS. 11 and 12.

Note that the patterns of passage order described with reference to FIGS. 11 and 12 are examples. In addition, it is assumed that the patterns of passage order have not only two patterns of the first pattern and the second pattern but also a plurality of patterns of three or more patterns. For example, in the example illustrated in FIG. 12, in a case where the unmanned vehicle 2B and the unmanned vehicle 2C cannot simultaneously travel through the intersection IS, a first pattern in which the unmanned vehicle 2A passes through the intersection IS first, a second pattern in which the unmanned vehicle 2B passes through the intersection IS first, and a third pattern in which the unmanned vehicle 2C passes through the intersection IS first are calculated as the patterns of passage order.

Note that, as the case where the unmanned vehicle 2B and the unmanned vehicle 2C cannot simultaneously travel through the intersection IS, it is exemplified that the travel permission area AP set to the unmanned vehicle 2B and the travel permission area AP set to the unmanned vehicle 2C overlap at the intersection IS.

The time loss calculation unit 48 calculates a time loss $^i t_{loss}$ of each of the plurality of unmanned vehicles i at the intersection IS, for each of the plurality of patterns of passage order at the intersection IS calculated by the passage pattern calculation unit 47. In the embodiment, the time loss $^i t_{loss}$ is a time loss of each of the plurality of unmanned vehicles i, which is scheduled to enter the intersection IS, at the intersection IS.

The time loss $^i t_{loss}$ of the unmanned vehicle i refers to a difference between a time required for the unmanned vehicle i to pass through the intersection IS without decelerating and a time required to pass through the intersection IS while decelerating or stopping.

As illustrated in FIG. 11, when the unmanned vehicle 2A passes through the intersection IS first, traveling of the unmanned vehicle 2B, the unmanned vehicle 2C, and the unmanned vehicle 2E is restricted to avoid interference between the plurality of unmanned vehicles 2. In other words, the unmanned vehicle 2B and the unmanned vehicle 2C are stopped or decelerated in front of the intersection area ISA without entering the intersection IS to avoid interference with the unmanned vehicle 2A. In addition, the unmanned vehicle 2E travels behind the unmanned vehicle 2C, and therefore, the unmanned vehicle 2E is stopped or decelerated as the unmanned vehicle 2C is stopped or decelerated. Therefore, the time loss $^i t_{loss}$ occurs in each of the unmanned vehicle 2B, the unmanned vehicle 2C, and the unmanned vehicle 2E. When the traveling of the unmanned vehicle 2D traveling behind the unmanned vehicle 2A is not restricted, the unmanned vehicle 2D passes through the intersection IS together with the unmanned vehicle 2A. When the traveling of the unmanned vehicle 2D is not restricted, the time loss $^i t_{loss}$ does not occur in the unmanned vehicle 2A and the unmanned vehicle 2D. For example, in some cases, after the unmanned vehicle 2A passes through the intersection IS, the unmanned vehicle 2B may pass through the intersection IS before the unmanned vehicle 2D passes through the intersection IS. In this case, the time loss $^i t_{loss}$ occurs in the unmanned vehicle 2D.

As illustrated in FIG. 12, when the unmanned vehicle 2B and the unmanned vehicle 2C pass through the intersection IS first, traveling of the unmanned vehicle 2A and the unmanned vehicle 2D is restricted to avoid interference between the plurality of unmanned vehicles 2. In other words, the unmanned vehicle 2A is stopped or decelerated in front of the intersection area ISA without entering the intersection IS to avoid interference with the unmanned vehicle 2B and the unmanned vehicle 2C. In addition, the unmanned vehicle 2D travels behind the unmanned vehicle 2A, and therefore, the unmanned vehicle 2D is stopped or decelerated as the unmanned vehicle 2A is stopped or decelerated. Therefore, the time loss $^i t_{loss}$ occurs in each of the unmanned vehicle 2A and the unmanned vehicle 2D. When the traveling of the unmanned vehicle 2E traveling behind the unmanned vehicle 2C is not restricted, the unmanned vehicle 2E passes through the intersection IS together with the unmanned vehicle 2C. When the traveling of the unmanned vehicle 2E is not restricted, the time loss $^i t_{loss}$ does not occur in the unmanned vehicle 2B, the unmanned vehicle 2C, and the unmanned vehicle 2E. For example, in some cases, after the unmanned vehicle 2C passes through the intersection IS, the unmanned vehicle 2A may pass through the intersection IS before the unmanned vehicle 2E passes through the intersection IS. In this case, the time loss $^i t_{loss}$ occurs in the unmanned vehicle 2E.

As described above, the time loss calculation unit 48 calculates the time loss $^i t_{loss}$ of each of all the unmanned vehicles i (the unmanned vehicle 2A, the unmanned vehicle 2B, the unmanned vehicle 2C, the unmanned vehicle 2D, and the unmanned vehicle 2E) that are scheduled to pass through the intersection IS, for each of the plurality of patterns of passage order of the plurality of unmanned vehicles 2 (the unmanned vehicle 2A, the unmanned vehicle 2B, and the unmanned vehicle 2C) at the intersection IS facing the intersection area ISA.

The loading loss calculation unit 49 calculates a loading loss in the loading work for each of the plurality of unmanned vehicles i, for each of the plurality of patterns of passage order at the intersection IS, on the basis of the travel margin $^i d$ and the time loss $^i t_{loss}$ of each of the plurality of unmanned vehicles i scheduled to pass through the intersection IS. In the embodiment, the loading loss is an increased target arrival time delay $^i \Delta t_{delay}$ of each of the plurality of unmanned vehicles i in the loading place LPA. The loading loss calculation unit 49 calculates the increased target arrival time delay $^i \Delta t_{delay}$ at the waiting point WP in the loading place LPA of each of the plurality of unmanned vehicles i, for each of the plurality of patterns calculated by the passage pattern calculation unit 47, on the basis of the travel margin $^i d$ and the time loss $^i t_{loss}$ of each of the plurality of unmanned vehicles i scheduled to pass through the intersection IS.

As described with reference to FIG. 8, when the unmanned vehicle 2A and the unmanned vehicle 2D travel toward the first loader 3A (first loading place LPA1) according to the first course data CD1, the loading loss calculation unit 49 calculates the increased target arrival time delay $^i \Delta t_{delay}$ at the waiting point WP in the first loading place LPA1 of each of the unmanned vehicle 2A and the unmanned vehicle 2D, for each of the first pattern and the second pattern that are calculated by the passage pattern calculation unit 47. When the unmanned vehicle 2B travels toward the second loader 3B (second loading place LPA2) according to the second course data CD2, the loading loss calculation unit 49 calculates the increased target arrival time delay $^i\Delta t_{delay}$ at the waiting point WP in the second loading place LPA2 of the unmanned vehicle 2B, for each of the first pattern and the second pattern calculated by the passage pattern calculation unit 47. When the unmanned vehicle 2C and the unmanned vehicle 2E travel toward the third loader 3C (third loading place LPA3) according to the third course data CD3, the loading loss calculation unit 49 calculates the increased target arrival time delay $^i\Delta t_{delay}$ at the waiting point WP in the third loading place LPA3 of each of the unmanned vehicle 2C and the unmanned vehicle 2E, for each of the first pattern and the second pattern calculated by the passage pattern calculation unit 47.

The increased target arrival time delay $^i\Delta t_{delay}$ of the unmanned vehicle i means an increased amount in the idle time of the loader 3 that is caused by non-arrival of the unmanned vehicle i at the waiting point WP in the loading place LPA by the target arrival time $^iT_{target}$ (the estimated ending time $^iT_{end}$ of the loading work for the preceding unmanned vehicle 2). When the travel margin $^id$ of the unmanned vehicle i is large, the idle time does not increase and the increased target arrival time delay $^i\Delta t_{delay}$ does not increase, even if the time loss $^it_{loss}$ of the unmanned vehicle i occurs. On the other hand, when the travel margin $^id$ of the unmanned vehicle i is small, the idle time increases and the increased target arrival time delay $^i\Delta t_{delay}$ increases, if the unmanned vehicle i cannot arrive at the waiting point WP in the loading place LPA by the target arrival time $^iT_{target}$. In other words, the increased target arrival time delay $^i\Delta t_{delay}$ of the unmanned vehicle i is determined on the basis of the travel margin $^id$ and the time loss $^it_{loss}$ of the unmanned vehicle i. The increased target arrival time delay $^i\Delta t_{delay}$ is calculated on the basis of the following formula (2).

$$^i\Delta t_{delay} = \begin{cases} ^it_{loss} & \text{if } ^id < 0 \\ ^it_{loss} - ^id & \text{if } 0 \leq ^id < ^it_{loss} \\ 0 & \text{if } ^it_{loss} \leq ^id \end{cases} \quad (2)$$

As shown in formula (2), when the travel margin $^id$ is less than 0 (negative value), the increased target arrival time delay $^i\Delta t_{delay}$ is equal to the time loss $^it_{loss}$. When the travel margin $^id$ is 0 or more and less than $^it_{loss}$, the increased target arrival time delay $^i\Delta t_{delay}$ is a value obtained by subtracting the travel margin $^id$ from the time loss $^it_{loss}$. When the travel margin $^id$ is equal to or more than $^it_{loss}$, the increased target arrival time delay $^i\Delta t_{delay}$ is zero. In other words, when the travel margin $^id$ has a positive value, the increased target arrival time delay $^i\Delta t_{delay}$ at the waiting point WP in the loading place LPA of the unmanned vehicle i is small or zero, even if the time loss $^it_{loss}$ occurs in the unmanned vehicle i at the intersection IS.

On the basis of a plurality of the loading losses calculated by the loading loss calculation unit 49, the total loading loss calculation unit 50 calculates the total loading loss indicating the total of loss amounts in operation of each of the plurality of loaders 3, for each of the plurality of patterns of passage order at the intersection IS calculated by the passage pattern calculation unit 47. In the embodiment, the total loading loss is a total loading loss $^Nsum_{delay}$ that indicates a total of the increased target arrival time delays $^i\Delta t_{delay}$ of each of the plurality of unmanned vehicles 2.

In other words, the total loading loss $^Nsum_{delay}$ indicates a total of the increased amounts in the idle time of each of the plurality of loaders 3, calculated for each of the plurality of patterns of passage order. The total loading loss calculation unit 50 calculates the total loading loss $^Nsum_{delay}$ indicating the total of the increased target arrival time delays $^i\Delta t_{delay}$ of each of the plurality of unmanned vehicles 2, on the basis of the plurality of increased target arrival time delays $^i\Delta t_{delay}$ calculated by the loading loss calculation unit 49, for each of the plurality of patterns calculated by the passage pattern calculation unit 47.

The total loading loss $^Nsum_{delay}$ is calculated on the basis of the following formula (3).

$$^Nsum_{delay} = \sum_{i=0}^{n-1} {^i\Delta t_{delay}} \quad (3)$$

As described with reference to FIG. 8, when there are the first loading place LPA1, the second loading place LPA2, and the third loading place LPA3 in which the first loader 3A, the second loader 3B, and the third loader 3C operate, respectively, the total loading loss calculation unit 50 calculates a first total loading loss $^1sum_{delay}$ for the first pattern of the passage order described with reference to FIG. 11. The first total loading loss $^1sum_{delay}$ indicates a total of the increased target arrival time delay $^i\Delta t_{delay}$ of the unmanned vehicle 2A in the first loading place LPA1, the increased target arrival time delay $^i\Delta t_{delay}$ of the unmanned vehicle 2D in the first loading place LPA1, the increased target arrival time delay $^i\Delta t_{delay}$ of the unmanned vehicle 2B in the second loading place LPA2, the increased target arrival time delay $^i\Delta t_{delay}$ of the unmanned vehicle 2C in the third loading place LPA3, and the increased target arrival time delay $^i\Delta t_{delay}$ of the unmanned vehicle 2E in the third loading place LPA3.

In addition, the total loading loss calculation unit 50 calculates a second total loading loss $^2sum_{delay}$, for the second pattern of the passage order described with reference to FIG. 12. The second total loading loss $^2sum_{delay}$ indicates a total of the increased target arrival time delay $^i\Delta t_{delay}$ of the unmanned vehicle 2A in the first loading place LPA1, the increased target arrival time delay $^i\Delta t_{delay}$ of the unmanned vehicle 2D in the first loading place LPA1, the increased target arrival time delay $^i\Delta t_{delay}$ of the unmanned vehicle 2B in the second loading place LPA2, the increased target arrival time delay $^i\Delta t_{delay}$ of the unmanned vehicle 2C in the third loading place LPA3, and the increased target arrival time delay $^i\Delta t_{delay}$ of the unmanned vehicle 2E in the third loading place LPA3.

The priority determination unit 51 determines the passage order at the intersection IS on the work site of the plurality of unmanned vehicles 2 traveling according to the course data CD so as to reduce the total loading loss indicating the total of the loss amounts in operation of each of the plurality of loaders 3.

The priority determination unit 51 determines, as the passage order of the plurality of unmanned vehicles 2 at the intersection IS, a pattern of passage order that has the minimum total loading loss $^Nsum_{delay}$, on the basis of the plurality of total loading losses $^Nsum_{delay}$ ($^1sum_{delay}$ and $^2sum_{delay}$) calculated by the total loading loss calculation unit 50.

When there are the first loading place LPA1, the second loading place LPA2, and the third loading place LPA3 in which the first loader 3A, the second loader 3B, and the third loader 3C operate, respectively, and the first total loading loss $^1sum_{delay}$ in the first pattern of the passage order and the second total loading loss $^2\text{sum}_{delay}$ in the second pattern of the passage order are calculated, the priority determination unit 51 selects the minimum total loading loss $^N\text{sum}_{delay}$ from the first total loading loss $^1\text{sum}_{delay}$ and the second total loading loss $^2\text{sum}_{delay}$. For example, when the first total loading loss $^1\text{sum}_{delay}$ is selected as the minimum total loading loss $^N\text{sum}_{delay}$, the priority determination unit 51 determines the first pattern of the passage order, as the passage order of the plurality of unmanned vehicles 2 at the intersection IS.

As illustrated in FIG. 7, the control device 30 includes a position data input unit 31, a travel condition data acquisition unit 32, and a travel control unit 33.

The position data input unit 31 acquires data detected by the position detection device 28 of the unmanned vehicle 2. The data detected by the position detection device 28 indicates the position data of each unmanned vehicle 2. The position data of the unmanned vehicle 2 is transmitted to the management device 4 via the communication system 5.

The travel condition data acquisition unit 32 acquires the course data CD and the travel permission area AP from the management device 4 via the communication system 5.

The travel control unit 33 controls the travel of the unmanned vehicle 2 on the basis of the position data and the course data CD of the unmanned vehicle 2. The travel control unit 33 controls the travel unit 21 so that the unmanned vehicle 2 travels according to the course points CR of the course data CD on the basis of the position data of the unmanned vehicle 2. In addition, the travel control unit 33 controls the travel unit 21 on the basis of the target traveling speed defined at the course points CP. In addition, the travel control unit 33 controls the travel unit 21 on the basis of the travel permission area AP.

<Management Method>

Figure 13:
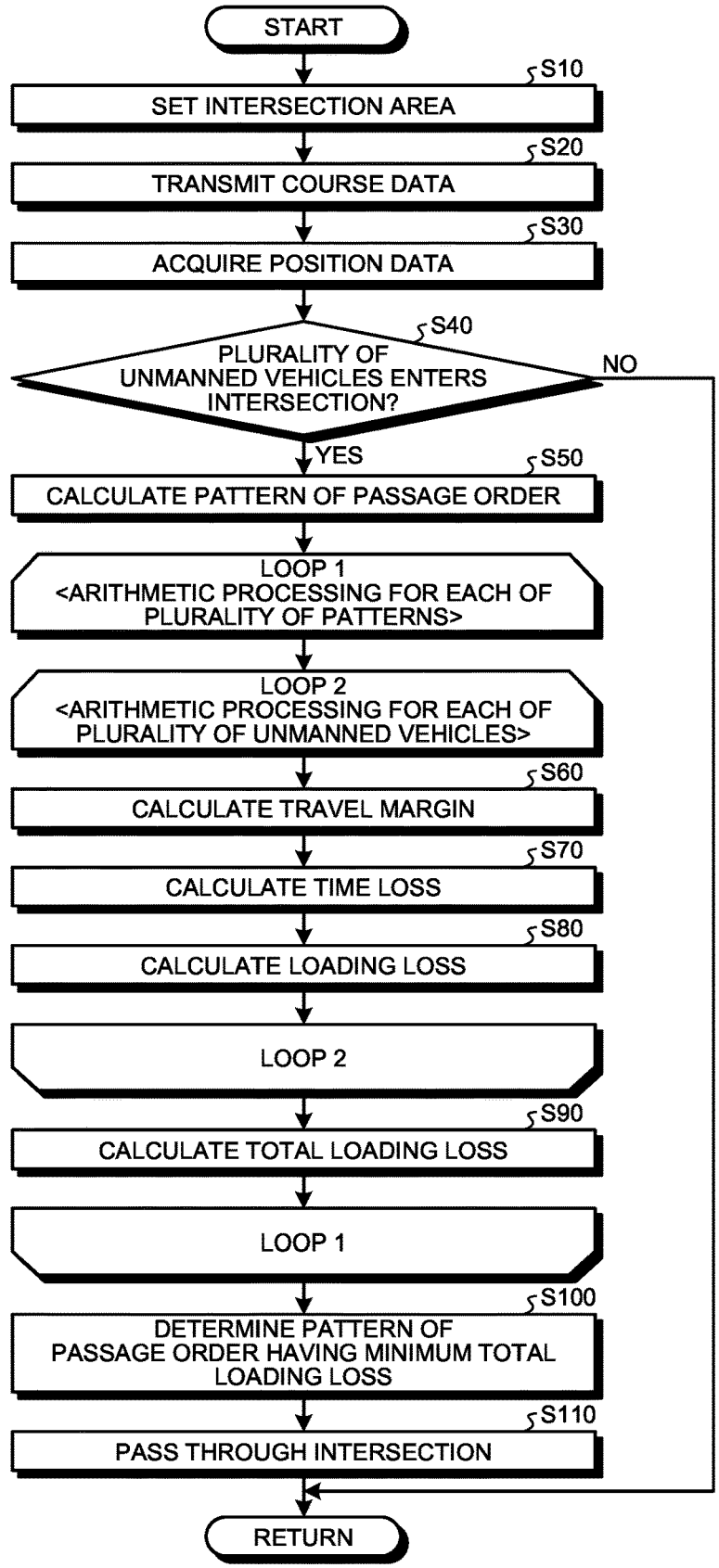
FIG. 13 is a flowchart illustrating a work site management method according to an embodiment.

FIG. 13 is a flowchart illustrating a work site management method according to the embodiment. The intersection area setting unit 42 sets the intersection area ISA to the intersection IS (Step S10).

The course data generation unit 41 generates the course data CD. The course data generation unit 41 transmits the course data CD to each unmanned vehicle 2 via the communication system 5. The course data generation unit 41 transmits the course data CD to each of the plurality of unmanned vehicles 2 operating on the work site. (Step S20).

The control device 30 of the unmanned vehicle 2 controls the travel unit 21 on the basis of the course data CD. The unmanned vehicle 2 travels on the work site according to the course data CD.

The position detection device 28 detects the position of the unmanned vehicle 2. The position data of the unmanned vehicle 2 detected by the position detection device 28 is transmitted to the management device 4 via the communication system 5. The position data acquisition unit 44 acquires the position data of the unmanned vehicle 2. The position data acquisition unit 44 acquires position data of each of the plurality of unmanned vehicles 2 operating on the work site (Step S30).

The entry determination unit 45 determines whether the plurality of unmanned vehicles 2 enters the intersection IS on the work site, on the basis of the position data of the plurality of unmanned vehicles 2 acquired by the position data acquisition unit 44. In the embodiment, the entry determination unit 45 determines whether the plurality of unmanned vehicles 2 enters the intersection IS, on the basis of the relative position between the travel permission area AP set in front of each of the unmanned vehicles 2 in the travel direction and the intersection IS (Step S40).

In Step S40, when it is determined that the plurality of unmanned vehicles 2 enters the intersection IS (Step S40: Yes), the passage pattern calculation unit 47 calculates the plurality of patterns of passage order of the plurality of unmanned vehicles 2, entering the intersection IS, at the intersection IS (Step S50).

In the embodiment, it is assumed that two patterns of the first pattern described with reference to FIG. 11 and the second pattern described with reference to FIG. 12 are calculated as the patterns of passage order.

After the patterns of passage order is calculated, the arithmetic processing of determining the passage order is started. In the embodiment, when it is determined in Step S40 that the plurality of unmanned vehicles 2 enters the intersection IS (Step S40: Yes), the processing of calculating the total loading loss $^N\text{sum}_{delay}$ is started for each of the plurality of patterns of passage order.

First, the processing of calculating the first total loading loss $^1\text{sum}_{delay}$ is started for the first pattern. The travel margin calculation unit 46 calculates the travel margin $^i d$ indicating a value obtained by subtracting the estimated arrival time $^i T_{estimate}$ from the target arrival time $^i T_{target}$ for the unmanned vehicle 2 at the loading place LPA where the loading work is performed, for each of the plurality of unmanned vehicles i scheduled to enter the intersection IS (Step S60).

In the embodiment, the plurality of unmanned vehicles i scheduled to enter the intersection IS is five unmanned vehicles 2A, 2B, 2C, 2D, and 2E. In other words, i=1 to 5.

The time loss calculation unit 48 calculates the time loss $^i t_{loss}$ of each of the plurality of unmanned vehicles i at the intersection IS (Step S70).

The loading loss calculation unit 49 calculates the loading loss in the loading work for each of the plurality of unmanned vehicles i on the basis of the travel margin $^i d$ calculated in Step S60 and the time loss $^i t_{loss}$ calculated in Step S70 (Step S80).

In the embodiment, the loading loss is an increased target arrival time delay $^i \Delta t_{delay}$ of each of the plurality of unmanned vehicles i in the loading place LPA.

In the first loop of the arithmetic processing of calculating the increased target arrival time delay $^i \Delta t_{delay}$ (loading loss), the increased target arrival time delay $^1 \Delta t_{delay}$ of the unmanned vehicle 2A is calculated.

After the increased target arrival time delay $^1 \Delta t_{delay}$ is calculated, the processing of calculating the increased target arrival time delay $^i \Delta t_{delay}$, total loading loss, is started for the unmanned vehicle 2B. The processing from Step S60 to Step S80 described above is performed as the second loop, for the unmanned vehicle 2B, whereby the increased target arrival time delay $^2 \Delta t_{delay}$ of the unmanned vehicle 2B is calculated. Similarly, the increased target arrival time delay $^3 \Delta t_{delay}$ of the unmanned vehicle 2C, the increased target arrival time delay $^4 \Delta t_{delay}$ of the unmanned vehicle 2D, and the increased target arrival time delay $^5 \Delta t_{delay}$ of the unmanned vehicle 2E are calculated.

The total loading loss calculation unit 50 calculates the total loading loss $^N\text{sum}_{delay}$ on the basis of the increased target arrival time delay $^i \Delta t_{delay}$ of each of the plurality of unmanned vehicles i calculated in Step S80 (Step S90).

In the embodiment, the total loading loss $^N\text{sum}_{delay}$ is the total of the increased target arrival time delays $^i \Delta t_{delay}$ of each of the plurality of unmanned vehicles 2 calculated in Step S80.

In the first loop of the arithmetic processing of calculating the total loading loss $^N\text{sum}_{delay}$, the first total loading loss $^i\text{sum}_{delay}$ in the first pattern is calculated.

After the first total loading loss $^1\text{sum}_{delay}$ is calculated, the processing of calculating the total loading loss is started for the second pattern. The processing from Step S60 to Step S90 described above is performed as the second loop, for the second pattern, whereby the second total loading loss $^2\text{sum}_{delay}$ for the second pattern is calculated.

After the loop processing of calculating the total loading loss $^N\text{sum}_{delay}$ for each of the plurality of patterns is finished, the priority determination unit 51 determines, as the passage order, a pattern of passage order that has the minimum total loading loss $^N\text{sum}_{delay}$, on the basis of the first total loading loss $^1\text{sum}_{delay}$ and the second total loading loss $^2\text{sum}_{delay}$ calculated in the loop processing (Step S100).

The priority determination unit 51 transmits the passage order determined in Step S100 to the plurality of unmanned vehicles i scheduled to enter the intersection IS via the communication system 5. The plurality of unmanned vehicles i passes through the intersection IS according to the passage order determined by the priority determination unit 51 (Step S110).

In Step S40, when it is determined that the plurality of unmanned vehicles 2 does not enter the intersection IS (Step S40: No), the plurality of unmanned vehicles i passes through the intersection IS according to the course data CD (Step S110).

[Computer System]

Figure 14:
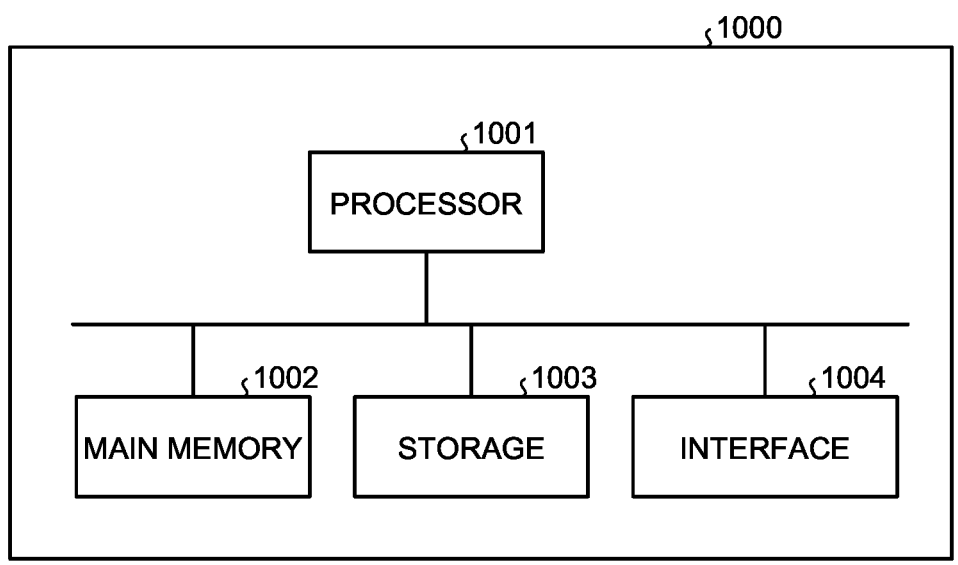
FIG. 14 is a block diagram illustrating a computer system according to an embodiment.

FIG. 14 is a block diagram illustrating a computer system 1000 according to the embodiment. The management device 4 and the control device 30 described above each include the computer system 1000. The computer system 1000 includes a processor 1001 such as a central processing unit (CPU), a main memory 1002 that includes a nonvolatile memory such as a read only memory (ROM) and a volatile memory such as a random access memory (RAM), a storage 1003, and an interface 1004 that includes an input/output circuit. The functions of the management device 4 and control device 30 which are described above are stored, as computer programs, in the storage 1003. The processor 1001 reads a computer program from the storage 1003, loads the program into the main memory 1002, and executes the processing described above according to the computer program. Note that the computer programs may be distributed to the computer system 1000 via a network.

According to the embodiment described above, the computer program or the computer system 1000 is configured to generate the course data CD for each of the plurality of unmanned vehicles 2 so as to sequentially perform the loading work for the plurality of unmanned vehicles 2 by the loader 3 on the work site where the plurality of loaders operates, to determine the passage order at the intersection IS on the work site of the plurality of unmanned vehicles 2 traveling according to the course data CD so as to reduce the total loading loss indicating the total of the loss amounts in operation of each of the plurality of loaders 3, and to control the travel of the plurality of unmanned vehicles 2 so that the plurality of unmanned vehicles 2 passes through the intersection IS on the basis of the determined passage order.

[Effects]

As described above, according to the embodiment, the passage order of the plurality of unmanned vehicles 2 at the intersection IS is determined so as to reduce the total loading loss indicating the total of the loss amounts in operation of each of the plurality of loaders 3, on the work site where the plurality of loaders 3 operates. In the embodiment, the increased target arrival time delay $^i\Delta t_{delay}$ corresponding to the increased amount in the idle time of the loader 3 is calculated, and the total loading loss $^N\text{sum}_{delay}$ corresponding to the total of the increased amount in the idle time of the plurality of loaders 3 is calculated. Determining the passage order of the plurality of unmanned vehicles 2 at the intersection IS to reduce the total loading loss $^N\text{sum}_{delay}$ suppresses the increase in the idle time of each of the plurality of loaders 3. Therefore, the decrease in the productivity on the work site is suppressed.

In the embodiment, the travel margin $^id$ indicating a value obtained by subtracting the estimated arrival time $^iT_{estimate}$ from the target arrival time $^iT_{target}$ for the unmanned vehicle 2 in the loading place LPA is calculated. The increased target arrival time delay $^i\Delta t_{delay}$ corresponding to the increased amount in the idle time of the loader 3 is calculated on the basis of the travel margin $^id$. Therefore, the idle time of the loader 3 is appropriately calculated.

In the embodiment, the plurality of patterns of the passage order of the plurality of unmanned vehicles 2 at the intersection IS is calculated. The total loading loss $^N\text{sum}_{delay}$ is calculated for each of the plurality of patterns. In the embodiment, the patterns of passage order includes two types of the first pattern and the second pattern, and the first total loading loss $^1\text{sum}_{delay}$ is calculated for the first pattern, and the second total loading loss $^2\text{sum}_{delay}$ is calculated for the second pattern. Selecting a pattern of passage order that has the minimum total loading loss $^N\text{sum}_{delay}$ from the plurality of total loading losses $^N\text{sum}_{delay}$ determines the passage order of the plurality of unmanned vehicles 2 at the intersection IS so as to reduce the total loading loss $^N\text{sum}_{delay}$.

In the embodiment, for the target arrival time $^iT_{target}$ of the next unmanned vehicle 2, the estimated ending time $^iT_{end}$ of the loading work for the preceding unmanned vehicle 2 is set. Accordingly, setting the target arrival time $^iT_{target}$ to the time earlier than the estimated ending time $^iT_{end}$ increases a time period during which the next unmanned vehicle 2 waits at the waiting point WP. Setting the target arrival time $^iT_{target}$ to the time later than the estimated ending time $^iT_{end}$ causes the idle time of the loader 3. Setting the target arrival time $^iT_{target}$ of the next unmanned vehicle 2 to the estimated ending time $^iT_{end}$ of the loading work for the preceding unmanned vehicle 2 suppresses the reduction in the productivity on the work site.

In the embodiment, the target arrival time $^iT_{target}$ of the unmanned vehicle 2 at the loading place LPA is the target arrival time at the waiting point WP. For example, if the target arrival time $^iT_{target}$ is the target arrival time at the loading point LP, there is a possibility that the next unmanned vehicle 2 interferes with the preceding unmanned vehicle 2 for which the loading work is being performed at the loading point LP. When the target arrival time $^iT_{target}$ is the target arrival time at the waiting point WP, the plurality of unmanned vehicles 2 can smoothly travel.

In the embodiment, when it is determined that the plurality of unmanned vehicles 2 enters the intersection IS, on the basis of the position data of each of the plurality of unmanned vehicles 2, the arithmetic processing of calculating the total loading loss is started. This suppresses a load on the arithmetic processing of the management device 4.

Second Embodiment

A second embodiment will be described. In the following description, component elements the same as or equivalent to those in the above embodiment are denoted by the same reference numerals and symbols, and description thereof will be simplified or omitted.

In the embodiment described above, the loading loss is the increased target arrival time delay $^i\Delta t_{delay}$ corresponding to the increased amount in the idle time of the loader 3, and the total loading loss is the total loading loss $^N\text{sum}_{delay}$ corresponding to the total of the increase amount in the idle time of the plurality of loaders 3. The loading loss may be a production loss amount $^iM_{loss}$ that indicates the product of the increased target arrival time delay $^i\Delta t_{delay}$ of each of the plurality of unmanned vehicles 2 in the loading place LPA by a loading amount $^im$ by the loader 3 per unit time, and the total loading loss may be a total loading loss $^N\text{sum}_{loss}$ that indicates a total of the production loss amounts $^iM_{loss}$ of each of the plurality of unmanned vehicles 2.

When the delays in arrival of the plurality of unmanned vehicles 2 to the plurality of loaders 3 simultaneously occur, use of the production loss amount $^iM_{loss}$ instead of the increased target arrival time delay $^i\Delta t_{delay}$, as the loading loss can cause the unmanned vehicle 2 that travels toward the loader 3 having a large influence on the productivity on the work site to pass through the intersection IS preferentially.

The loading loss calculation unit 49 calculates the production loss amount $^iM_{loss}$ for each of the plurality of patterns of passage order calculated by the passage pattern calculation unit 47 on the basis of the travel margin $^id$ and the time loss $^it_{loss}$.

The loading amount $^im$ is an amount of load with which the loader 3 can load the unmanned vehicle 2 per unit time. The loading amount $^im$ is, for example, known data that is determined from the specifications of the loader 3. The production loss amount $^iM_{loss}$ of the unmanned vehicle i means a lost loading amount of the loader 3 that is caused by non-arrival of the unmanned vehicle i at the waiting point WP in the loading place LPA by the target arrival time $^iT_{target}$. Even if the time loss $^it_{loss}$ of the unmanned vehicle i occurs, when the unmanned vehicle i has a large travel margin $^id$, the lost loading amount does not increase and the production loss amount $^iM_{loss}$ does not increase. On the other hand, when the unmanned vehicle i has a small travel margin $^id$, the lost loading amount increases and the production loss amount $^iM_{loss}$ increases when the unmanned vehicle i cannot arrive at the waiting point WP in the loading place LPA by the target arrival time $^iT_{target}$. In other words, the production loss amount $^iM_{loss}$ of the unmanned vehicle i is determined on the basis of the travel margin $^id$ and the time loss $^it_{loss}$ of the unmanned vehicle i, and the loading amount $^im$ by the loader 3 per unit time. The production loss amount $^iM_{loss}$ is calculated on the basis of the following formula (4).

$$^iM_{loss} = \begin{cases} ^im\,^it_{loss} & \text{if } ^id < 0 \\ ^im(^it_{loss} - ^id) & \text{if } 0 \leq ^id < ^it_{loss} \\ 0 & \text{if } ^it_{loss} \leq ^id \end{cases} \quad (4)$$

As shown in formula (4), when the travel margin $^id$ is less than 0 (negative value), the production loss amount $^iM_{loss}$ is equal to the product of the time loss $^it_{loss}$ by the loading amount $^im$. When the travel margin $^id$ is 0 or more and less than $^it_{loss}$, the production loss amount $^iM_{loss}$ is the product of a value obtained by subtracting the travel margin $^id$ from the time loss $^it_{loss}$ by the loading amount $^im$. When the travel margin $^id$ is equal to or more than $^it_{loss}$, the production loss amount $^iM_{loss}$ is zero.

The total loading loss calculation unit 50 calculates, for each of the plurality of patterns of passage order at the intersection IS calculated by the passage pattern calculation unit 47, the total loading loss $^N\text{sum}_{loss}$ indicating the total of the production loss amounts $^iM_{loss}$ of each of the plurality of loaders 3, on the basis of a plurality of production loss amounts $^iM_{loss}$ calculated by the loading loss calculation unit 49. The total loading loss $^N\text{sum}_{loss}$ is calculated on the basis of the following formula (5).

$$^N\text{sum}_{loss} = \sum_{i=0}^{n-1} {}^iM_{loss} \quad (5)$$

The total loading loss calculation unit 50 calculates a first total loading loss $^1\text{sum}_{loss}$, for the first pattern of the passage order described with reference to FIG. 11. The first total loading loss $^1\text{sum}_{loss}$ indicates a total of the production loss amount $^iM_{loss}$ of the unmanned vehicle 2A in the first loading place LPA1, the production loss amount $^iM_{loss}$ of the unmanned vehicle 2D in the first loading place LPA1, the production loss amount $^iM_{loss}$ of the unmanned vehicle 2B in the second loading place LPA2, the production loss amount $^iM_{loss}$ of the unmanned vehicle 2C in the third loading place LPA3, and the production loss amount $^iM_{loss}$ of the unmanned vehicle 2E in the third loading place LPA3.

In addition, the total loading loss calculation unit 50 calculates a second total loading loss $^2\text{sum}_{loss}$, for the second pattern of the passage order described with reference to FIG. 12. The second total loading loss $^2\text{sum}_{loss}$ indicates a total of the production loss amount $^iM_{loss}$ of the unmanned vehicle 2A in the first loading place LPA1, the production loss amount $^iM_{loss}$ of the unmanned vehicle 2D in the first loading place LPA1, the production loss amount $^iM_{loss}$ of the unmanned vehicle 2B in the second loading place LPA2, the production loss amount $^iM_{loss}$ of the unmanned vehicle 2C in the third loading place LPA3, and the production loss amount $^iM_{loss}$ of the unmanned vehicle 2E in the third loading place LPA3.

The priority determination unit 51 determines the passage order at the intersection IS on the work site of the plurality of unmanned vehicles 2 traveling according to the course data CD so as to reduce the total loading loss indicating the total of the loss amounts in operation of each of the plurality of loaders 3.

When there are the first loading place LPA1, the second loading place LPA2, and the third loading place LPA3 in which the first loader 3A, the second loader 3B, and the third loader 3C operate, respectively, and the first total loading loss $^1\text{sum}_{loss}$ in the first pattern of the passage order and the second total loading loss $^2\text{sum}_{loss}$ in the second pattern of the passage order are calculated, the priority determination unit 51 selects the minimum total loading loss $^N\text{sum}_{loss}$ from the first total loading loss $^1\text{sum}_{loss}$ and the second total loading loss $^2\text{sum}_{loss}$. For example, when the first total loading loss $^1\text{sum}_{loss}$ is selected as the minimum total loading loss $^N\text{sum}_{loss}$, the priority determination unit 51 determines the first pattern of the passage order, as the passage order of the plurality of unmanned vehicles 2 at the intersection IS.

Third Embodiment

In the embodiments described above, the required loading time has the constant value (three minutes) per unmanned vehicle 2. Furthermore, the estimated ending time $^iT_{end}$ of the loading work has been calculated on the basis of the required loading time having a constant value. The required loading time may have a variable value.

Figure 15:
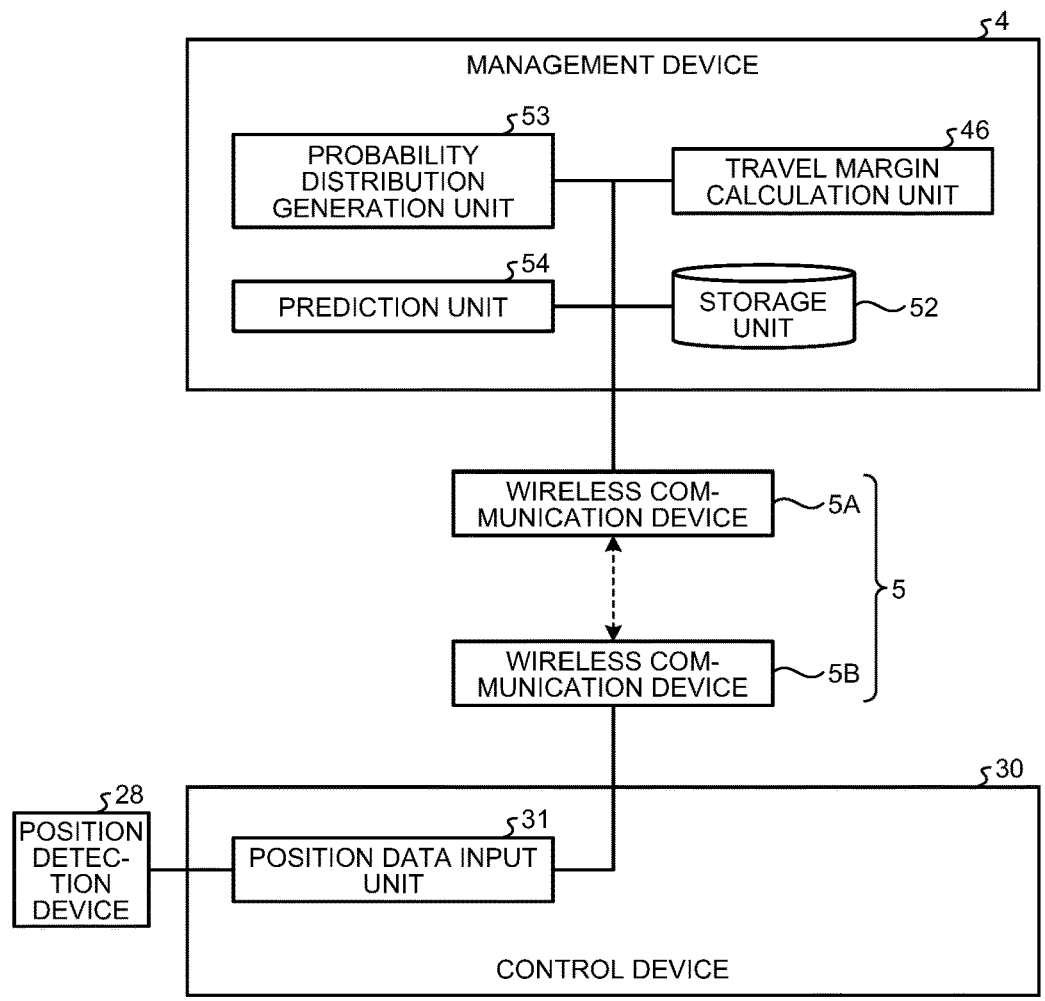
FIG. 15 is a functional block diagram illustrating the management system according to an embodiment.

FIG. 15 is a block diagram illustrating the management system 1 according to the embodiment. As illustrated in FIG. 15, the management device 4 includes a probability distribution generation unit 53 that generates a probability distribution of the required loading time on the basis of the record data about the required loading time for one unmanned vehicle 2, and a prediction unit 54 that calculates the estimated ending time $^iT_{end}$ of the loading work on the basis of the probability distribution and an elapsed time from starting the loading work.

The storage unit 52 stores a plurality of sets of record data about the required loading time that indicates a time required for the loading work for one unmanned vehicle 2 by one loader 3. In other words, the plurality of sets of record data is a plurality of sets of measurement data about the load required time measured in the past. The measurement data indicating the load required time measured in the past is stored in the storage unit 52 as the record data.

The probability distribution generation unit 53 generates the probability distribution of the required loading time on the basis of the plurality of sets of record data about the required loading time stored in the storage unit 52.

Figure 16:
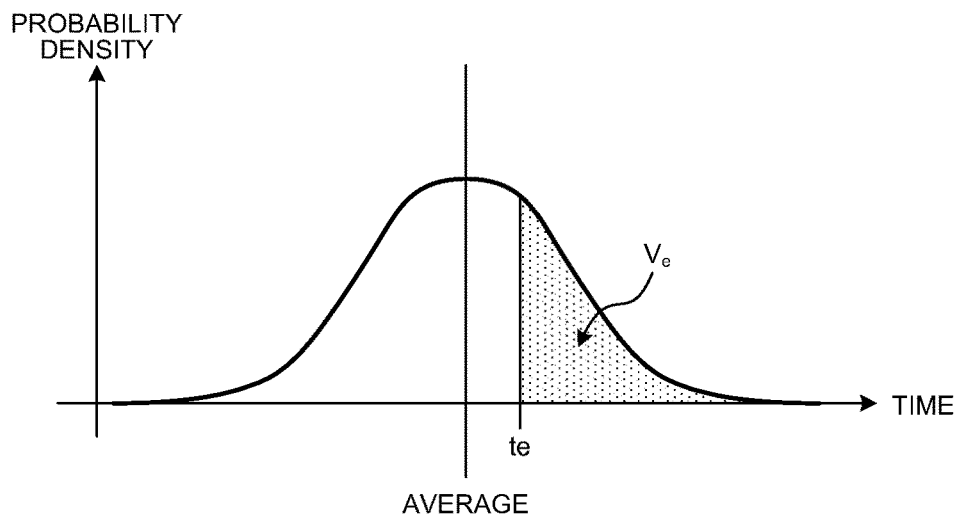
FIG. 16 is a graph illustrating a method of calculating estimated ending time of loading work according to an embodiment.

FIG. 16 is a graph illustrating a method of calculating the estimated ending time $^iT_{end}$ of the loading work according to the embodiment. As illustrated in FIG. 16, the probability distribution generation unit 53 generates the probability distribution of the required loading time on the basis of the plurality of sets of record data about the required loading time. In FIG. 16, the horizontal axis represents time that is a random variable, and the vertical axis represents a probability density. The average is, for example, 3 minutes.

The prediction unit 54 calculates an elapsed time te from starting the loading work for the unmanned vehicle 2. The elapsed time te from starting the loading work is substantially equal to an elapsed time after the unmanned vehicle 2 is arranged at the loading point LP on the basis of, for example, the position data of the unmanned vehicle 2. The prediction unit 54 acquires the position data of the unmanned vehicle 2 and calculates the elapsed time after the unmanned vehicle 2 is arranged at the loading point LP. Therefore, the elapsed time te from starting the loading work can be calculated. Note that the prediction unit 54 may calculate the elapsed time te from starting the loading work on the basis of the operation data transmitted from the loader 3. For example, the operator of the loader 3 operates the operation device provided at the loader 3 upon starting the loading work. The operation data indicating the start time of the loading work is transmitted from the loader 3 to the management device 4. The prediction unit 54 may calculate the elapsed time te from starting the loading work, on the basis of the operation data indicating the start time of the loading work.

The prediction unit 54 calculates the estimated ending time $^iT_{end}$ of the loading work, on the basis of the elapsed time te from starting the loading work and the probability distribution of the required loading time. As illustrated in FIG. 16, the prediction unit 54 calculates an expected value of the random variable by integrating the random variable within a range Ve larger than the elapsed time te. The prediction unit 54 sets the calculated expected value as the estimated ending time $^iT_{end}$ of the loading work.

OTHER EMBODIMENTS

In the embodiments described above, it is determined whether the plurality of unmanned vehicles 2 enters the intersection area ISA, on the basis of the relative position between the travel permission area AP and the intersection area ISA. In other words, the entry determination unit 45 determines that the unmanned vehicle 2 enters the intersection IS when the front portion of the travel permission area AP set for the unmanned vehicle 2 enters the intersection area ISA. The entry determination unit 45 may determine that the unmanned vehicle 2 enters the intersection IS when the front portion of the vehicle body 22 of the unmanned vehicle 2 enters the intersection area ISA.

In the embodiments described above, at least some of the functions of the control device 30 may be provided in the management device 4, or at least some of the functions of the management device 4 may be provided in the control device 30. For example, in the embodiments described above, the course data CD is generated by the management device 4, and the unmanned vehicle 2 travels according to the course data CD transmitted from the management device 4. The control device 30 of the unmanned vehicle 2 may generate the course data CD. In other words, the control device 30 may include the course data generation unit 41. In addition, each of the management device 4 and the control device 30 may include the course data generation unit 41.

In the above embodiments, it is assumed that the unmanned vehicle 2 is a dump truck that is a kind of transport vehicle. The unmanned vehicle 2 may be a work machine such as a wheel loader or motor grader.

In the above embodiments, the example has been described in which one loader 3 is arranged in each of the plurality of loading places LPA, but the present invention may also be applied to a plurality of loaders 3 that is arranged in one loading place LPA.

In the embodiments described above, the unmanned vehicles 2 may have the same rated load capacity, or the unmanned vehicles 2 having different rated load capacities may be mixed.

In the embodiments described above, the loaders 3 may have the same specification or different specifications (e.g., the bucket capacity). Furthermore, the loader 3 may be a wheel loader, in addition to the excavator.

REFERENCE SIGNS LIST

1 MANAGEMENT SYSTEM
2 UNMANNED VEHICLE
$2_{-1}$ UNMANNED VEHICLE
$2_{-2}$ UNMANNED VEHICLE
$2_{-3}$ UNMANNED VEHICLE
2A UNMANNED VEHICLE
2B UNMANNED VEHICLE
2C UNMANNED VEHICLE
2D UNMANNED VEHICLE
2E UNMANNED VEHICLE
3 LOADER
3A FIRST LOADER
3B SECOND LOADER
3C THIRD LOADER
4 MANAGEMENT DEVICE
5 COMMUNICATION SYSTEM
5A WIRELESS COMMUNICATION DEVICE
5B WIRELESS COMMUNICATION DEVICE
6 CONTROL FACILITY
7 CRUSHER
21 TRAVEL UNIT
22 VEHICLE BODY
23 DUMP BODY
24 DRIVING DEVICE
25 BRAKE DEVICE

26 STEERING DEVICE
27 WHEEL
27F FRONT WHEEL
27R REAR WHEEL
28 POSITION DETECTION DEVICE
30 CONTROL DEVICE
31 POSITION DATA INPUT UNIT
32 TRAVEL CONDITION DATA ACQUISITION UNIT
33 TRAVEL CONTROL UNIT
41 COURSE DATA GENERATION UNIT
42 INTERSECTION AREA SETTING UNIT
43 TRAVEL PERMISSION AREA SETTING UNIT
44 POSITION DATA ACQUISITION UNIT
45 ENTRY DETERMINATION UNIT
46 TRAVEL MARGIN CALCULATION UNIT
47 PASSAGE PATTERN CALCULATION UNIT
48 TIME LOSS CALCULATION UNIT
49 LOADING LOSS CALCULATION UNIT
50 TOTAL LOADING LOSS CALCULATION UNIT
51 PRIORITY DETERMINATION UNIT
52 STORAGE UNIT
53 PROBABILITY DISTRIBUTION GENERATION UNIT
54 PREDICTION UNIT
1000 COMPUTER SYSTEM
1001 PROCESSOR
1002 MAIN MEMORY
1003 STORAGE
1004 INTERFACE
AP TRAVEL PERMISSION AREA
CD COURSE DATA
CD1 FIRST COURSE DATA
CD2 SECOND COURSE DATA
CD3 THIRD COURSE DATA
CP COURSE POINT
CR TRAVEL COURSE
DPA DUMPING PLACE
LPA LOADING PLACE
LPA1 FIRST LOADING PLACE
LPA2 SECOND LOADING PLACE
LPA3 THIRD LOADING PLACE
HL TRANSPORT PATH
HL1 TRANSPORT PATH
HL2 TRANSPORT PATH
HL3 TRANSPORT PATH
HL4 TRANSPORT PATH
HLa TRANSPORT PATH
HLb TRANSPORT PATH
HLc TRANSPORT PATH
HLd TRANSPORT PATH
HLe TRANSPORT PATH
HLi TRANSPORT PATH
HLo TRANSPORT PATH
IS INTERSECTION
ISA INTERSECTION AREA
LP LOADING POINT
WP WAITING POINT
i UNMANNED VEHICLE
$^i$d TRAVEL MARGIN
$^i T_{end}$ ESTIMATED ENDING TIME
$^i T_{target}$ TARGET ARRIVAL TIME
$^i T_{estimate}$ ESTIMATED ARRIVAL TIME
$^i t_{loss}$ TIME LOSS
$^i \Delta t_{delay}$ INCREASED TARGET ARRIVAL TIME DELAY
$^N sum_{delay}$ TOTAL LOADING LOSS
$^1 sum_{delay}$ FIRST TOTAL LOADING LOSS
$^2 sum_{delay}$ SECOND TOTAL LOADING LOSS
$^i m$ LOADING AMOUNT
$^i M_{loss}$ PRODUCTION LOSS AMOUNT
$^N sum_{loss}$ TOTAL LOADING LOSS
$^1 sum_{loss}$ FIRST TOTAL LOADING LOSS
$^2 sum_{loss}$ SECOND TOTAL LOADING LOSS
te ELAPSED TIME
Ve RANGE

The invention claimed is:

1. A work site management system comprising:
a course data generation processor unit that generates course data for each of a plurality of unmanned vehicles such that loading work for a plurality of the unmanned vehicles by a loader is sequentially performed on a work site where a plurality of the loaders operates; and
a priority determination processor unit that determines a passage order at an intersection on the work site of a plurality of the unmanned vehicles traveling according to the course data so as to reduce a total loading loss indicating a total of loss amounts in operation of each of a plurality of the loaders,
a travel margin calculation processor unit that calculates a travel margin indicating a value obtained by subtracting estimated arrival time from target arrival time for the unmanned vehicle at a loading place where the loading work is performed;
a passage pattern calculation processor unit that calculates a plurality of patterns of the passage order at the intersection;
a time loss calculation processor unit that calculates a time loss of each of a plurality of the unmanned vehicles at the intersection, for each of a plurality of the patterns;
a loading loss calculation processor unit that calculates a loading loss in the loading work for each of a plurality of the unmanned vehicles, based on the travel margin and the time loss, for each of a plurality of the patterns; and
a total loading loss calculation processor unit that calculates the total loading loss based on a plurality of the loading losses calculated by the loading loss calculation processor unit, for each of a plurality of the patterns,
wherein the priority determination processor unit determines, as the passage order, the pattern that has the total loading loss being minimum, based on a plurality of the total loading losses calculated by the total loading loss calculation processor unit.

2. The work site management system according to claim 1, wherein next loading work is performed after preceding loading work is finished, and the target arrival time is estimated ending time of preceding loading work.

3. The work site management system according to claim 1, further comprising
a probability distribution generation processor unit that generates a probability distribution of a required loading time, based on record data about the required loading time for one of the unmanned vehicles; and
a prediction processor unit that calculates estimated ending time of loading work based on an elapsed time from starting the loading work and the probability distribution.

4. The work site management system according to claim 1, wherein a waiting point at which the unmanned vehicle waiting for the loading work is positioned and a loading point at which the unmanned vehicle for which the loading work is performed is positioned are set in the loading place, and the target arrival time is a target arrival time at the waiting point.

5. The work site management system according to claim 1, wherein the estimated arrival time is calculated based on the course data.

6. The work site management system according to claim 1, wherein the loading loss is an increased target arrival time delay of each of a plurality of the unmanned vehicles in the loading place, and the total loading loss is a total of the increased target arrival time delays of each of a plurality of the unmanned vehicles.

7. The work site management system according to claim 1, wherein the loading loss is a production loss amount indicating the product of an increased target arrival time delay of each of a plurality of the unmanned vehicles in the loading place and a loading amount by the loader per unit time, and the total loading loss is a total of the production loss amounts of each of a plurality of the unmanned vehicles.

8. The work site management system according to claim 1, further comprising:
   a position data acquisition processor unit that acquires position data of each of a plurality of the unmanned vehicles; and
   an entry determination processor unit that determines whether a plurality of the unmanned vehicles enters the intersection based on the position data,
   wherein when it is determined that a plurality of the unmanned vehicles enters the intersection, the total loading loss calculation processor unit starts arithmetic processing of calculating the total loading loss, for each of a plurality of the patterns.

9. The work site management system according to claim 8, further comprising
   a travel permission area setting processor unit that sets a travel permission area in front of the unmanned vehicle,
   wherein the entry determination processor unit determines whether a plurality of the unmanned vehicles enters the intersection, based on a relative position between the travel permission area and the intersection.

10. A work site management method comprising:
   generating course data for each of a plurality of unmanned vehicles such that loading work for a plurality of the unmanned vehicles by a loader is sequentially performed on a work site where a plurality of the loaders operates;
   determining a passage order at an intersection on the work site of a plurality of the unmanned vehicles traveling according to the course data so as to reduce a total loading loss indicating a total of loss amounts in operation of each of a plurality of the loaders;
   controlling travel of a plurality of the unmanned vehicles such that the unmanned vehicles pass through the intersection based on the passage order determined;
   calculate a travel margin indicating a value obtained by subtracting estimated arrival time from target arrival time for the unmanned vehicle at a loading place where the loading work is performed;
   calculate a plurality of patterns of the passage order at the intersection;
   calculate a time loss of each of a plurality of the unmanned vehicles at the intersection, for each of a plurality of the patterns;
   calculate a loading loss in the loading work for each of a plurality of the unmanned vehicles, based on the travel margin and the time loss, for each of a plurality of the patterns;
   calculate the total loading loss based on a plurality of the loading losses calculated, for each of a plurality of the patterns; and
   determine, as the passage order, the pattern that has the total loading loss being minimum, based on a plurality of the total loading losses calculated.

* * * * *